United States Patent
Bolfo et al.

(10) Patent No.: US 9,423,928 B1
(45) Date of Patent: Aug. 23, 2016

(54) SPECIALIZED COMPUTER PUBLISHING SYSTEMS FOR DYNAMIC NONLINEAR STORYTELLING CREATION BY VIEWERS OF DIGITAL CONTENT AND COMPUTER-IMPLEMENTED PUBLISHING METHODS OF UTILIZING THEREOF

(71) Applicant: Bonza Interactive Group, LLC, Long Island City, NY (US)

(72) Inventors: Antonio Bolfo, New York, NY (US); Michael Lanza, New York, NY (US); Mark McQuillan, Toronto (CA)

(73) Assignee: Bonza Interactive Group, LLC, Long Island City, NY (US)

( * ) Notice: Subject to any disclaimer, the term of this patent is extended or adjusted under 35 U.S.C. 154(b) by 3 days.

(21) Appl. No.: 14/625,562

(22) Filed: Feb. 18, 2015

Related U.S. Application Data

(60) Provisional application No. 61/941,220, filed on Feb. 18, 2014.

(51) Int. Cl.
| | |
|---|---|
| *G06F 3/0482* | (2013.01) |
| *G06F 3/0481* | (2013.01) |
| *G06F 3/0484* | (2013.01) |
| *H04L 29/08* | (2006.01) |

(52) U.S. Cl.
CPC ............ *G06F 3/0482* (2013.01); *G06F 3/0481* (2013.01); *G06F 3/04842* (2013.01); *H04L 67/10* (2013.01)

(58) Field of Classification Search
CPC . G06F 3/0482; G06F 3/0481; G06F 3/04842; H04L 67/10
See application file for complete search history.

(56) References Cited

U.S. PATENT DOCUMENTS

| | | | | |
|---|---|---|---|---|
| 5,644,686 | A * | 7/1997 | Hekmatpour | G06F 3/0481 706/45 |
| 9,113,215 | B1 * | 8/2015 | Berry, III | H04N 21/4722 |
| 2003/0018714 | A1 * | 1/2003 | Mikhailov | G06F 17/30861 709/203 |
| 2005/0071865 | A1 * | 3/2005 | Martins | H04H 60/33 725/10 |
| 2010/0005408 | A1 * | 1/2010 | Lanahan | G06T 11/60 715/764 |
| 2010/0005417 | A1 * | 1/2010 | Lanahan | G06F 3/0481 715/815 |
| 2011/0238688 | A1 | 9/2011 | Mercuri et al. | |
| 2013/0151974 | A1 * | 6/2013 | Cho | G06F 17/212 715/733 |
| 2013/0254651 | A1 * | 9/2013 | Lee | G06Q 30/00 715/234 |

* cited by examiner

*Primary Examiner* — Li Sun
(74) *Attorney, Agent, or Firm* — Greenberg Traurig, LLP

(57) ABSTRACT

In some embodiments, the instant invention provides for a computer system, including: a specifically programmed publishing server; a non-transitory database; a network publishing portal for connecting digital content creators and digital content viewers to the publishing server over a computer network; where the server, the database and the portal are programmed with specialized publishing software for: receiving digital content from each digital content creator; displaying a specifically programmed hotspot template; where the hotspot template permits to define a plurality of hotspots in the digital content; where each hotspot is an interactive visual programmed clue which allows the viewer to dynamically proceed to experience another portion of the digital content; and where, by sequentially experiencing a first portion of the digital content and another portion of the digital content, the viewer experiences a viewer personalized storyline digital experience which differs from a storyline digital experience pre-defined by the digital content creator.

14 Claims, 29 Drawing Sheets

SPECIALIZED COMPUTER PUBLISHING SYSTEMS FOR DYNAMIC NONLINEAR STORYTELLING CREATION BY VIEWERS OF DIGITAL CONTENT AND COMPUTER-IMPLEMENTED PUBLISHING METHODS OF UTILIZING THEREOF

RELATED APPLICATIONS

This application claims the priority of U.S. provisional application U.S. Patent Appln. No. 61/941,220; filed Feb. 18, 2014; entitled "DYNAMIC NONLINEAR STORYTELLING CREATION BY VIEWS OF DIGITAL CONTENT UTILIZING COMPUTER-IMPLEMENTED PUBLISHING SYSTEM AND COMPUTER-IMPLEMENTED PUBLISHING METHODS," which is incorporated herein by reference in its entirety for all purposes.

TECHNICAL FIELD

In some embodiments, the instant invention is related to computer publishing systems for controlling graphical user interfaces of user computer devices (e.g., desktops, laptops, smartphones, etc.) to allow users to experience digital content.

BACKGROUND

Typically, computer publishing systems compile, create, and/or manage digital content of publishers.

SUMMARY OF INVENTION

In some embodiments, the instant invention provides for a computer system, including: at least one specifically programmed publishing server; at least one non-transitory database accessible by the at least one specifically programmed publishing server, where the at least one non-transitory database is specifically programmed to being dedicated for use by the at least one specifically programmed publishing server; at least one first network publishing portal specifically programmed for connecting a plurality of digital content creators and a plurality of digital content viewers to the at least one specifically programmed publishing server and coupling the at least one specifically programmed publishing server and the at least one non-transitory database, where the at least one specifically programmed publishing server, the at least one non-transitory database and the at least one first network publishing portal being arranged such that the computer system provides the at least one first network portal to the plurality of digital content creators and the plurality of digital content viewers through a plurality of electronic devices respectively utilized by the plurality of digital content creators and the plurality of digital content viewers to access the at least one first network publishing portal over a computer network; where the at least one specifically programmed publishing server, the at least one non-transitory database and the at least one first network publishing portal are specifically programmed with specialized publishing software; where the specialized publishing software, upon execution, specifically transforms the at least one specifically programmed publishing server, the at least one non-transitory database and the at least one first network publishing portal to perform at least the following: receiving, by the computer system, particular digital content from each digital content creator of the plurality of digital content creators; displaying, by the computer system, at least one specifically programmed hotspot template; i) where the at least one specifically programmed hotspot template permits each digital content creator of the plurality of digital content creators to define a plurality of hotspots in the particular digital content; ii) where each hotspot is an interactive visual programmed clue shown to a viewer when the viewer experiences at least one first portion of the particular digital content which allows the viewer, by selecting such hotspot to dynamically proceed to experience at least one second portion of the particular digital content; iii) where the at least one specifically programmed hotspot template is programmed to define, for each hotspot, at least the following hotspot criteria: 1) when to display such hotspot during the particular digital content, 2) where to display such hotspot in a visual area of a screen of a viewing electronic device; and 3) what to display when such hotspot is selected by the viewer; iv) where, by sequentially experiencing the at least one first portion of the particular digital content and the at least one second portion of the particular digital content, the viewer is allowed, by the computer system, to create at least one viewer personalized storyline digital experience which differs from at least one storyline digital experience pre-defined by such digital content creator of the particular digital content; enabling, by the computer system, utilizing the at least one specifically programmed hotspot template, a particular digital content creator to define at least one particular storyline digital experience based on the particular digital content, where the at least one particular storyline digital experience having a first plurality of particular hotspots; and enabling, by the computer system, a particular viewer to create at least one particular viewer personalized storyline digital experience of the particular digital content based on selecting at least one first particular hotspot from the first plurality of particular hotspots; where the at least one particular viewer personalized storyline digital experience created by the particular viewer differs from the at least one particular storyline digital experience defined by the particular digital content creator.

In some embodiments, the at least one particular storyline digital experience has a timeline and where the at least one first particular hotspot from the first plurality of particular hotspots is located on the timeline.

In some embodiments, the at least one particular storyline digital experience comprises a plurality of recordings selected from the group consisting of video recording, audio recording, slideshow, and any combination thereof.

In some embodiments, the at least one particular storyline digital experience comprises at least one image.

In some embodiments, the specialized publishing software, upon execution, specifically transforms the at least one specifically programmed publishing server, the at least one non-transitory database and the at least one first network publishing portal to perform at least the following: enabling, by the computer system, the particular digital content creator to organize the particular digital content in a hierarchical nesting classification based on a plurality of level categories selected from the group consisting of series, stories, chapters, and subchapters; where the series is the most top level category and the subchapters is the lowest level category.

In some embodiments, the first plurality of particular hotspots allow the particular personalized the at least one particular viewer personalized storyline digital experience by moving around in the particular digital content in at least one of the following direction within the hierarchical nesting classification: i) within the same level category, ii) from a particular level category to many level categories, and iii) within many level categories.

In some embodiments, the specialized publishing software, upon execution, specifically transforms the at least one specifically programmed publishing server, the at least one non-transitory database and the at least one first network publishing portal to perform at least the following: encoding, by the computer system, the particular digital content as a plurality of discreet modular units based on the at least one specifically programmed hotspot template so that each of plurality of discreet modular units is individually accessible by the particular viewer to create the at least one particular viewer personalized storyline digital experience of the particular digital content based on selecting at least one first particular hotspot from the first plurality of particular hotspots.

In some embodiments, the at least one specifically programmed hotspot template allows to the particular digital content creator to define at least one of the following characteristics for each particular hotspot: i) a shape, ii) a size, iii) a start time, and iv) a duration.

In some embodiments, the particular digital content is in a question-and-answer format.

In some embodiments, the enabling, by the computer system, the particular viewer to create at least one particular viewer personalized storyline digital experience of the particular digital content is through at least one widget embedded in the at least one first network publishing portal.

In some embodiments, the instant invention provides for a computer-implemented method, including: receiving, by a computer system, particular digital content from each digital content creator of a plurality of digital content creators; where the computer system includes at least the following: at least one specifically programmed publishing server; at least one non-transitory database accessible by the at least one specifically programmed publishing server, where the at least one non-transitory database is specifically programmed to being dedicated for use by the at least one specifically programmed publishing server; at least one first network publishing portal specifically programmed for connecting the plurality of digital content creators and a plurality of digital content viewers to the at least one specifically programmed publishing server and coupling the at least one specifically programmed publishing server and the at least one non-transitory database, where the at least one specifically programmed publishing server, the at least one non-transitory database and the at least one first network publishing portal being arranged such that the computer system provides the at least one first network portal to the plurality of digital content creators and the plurality of digital content viewers through a plurality of electronic devices respectively utilized by the plurality of digital content creators and the plurality of digital content viewers to access the at least one first network publishing portal over a computer network; where the at least one specifically programmed publishing server, the at least one non-transitory database and the at least one first network publishing portal are specifically programmed with specialized publishing software, enabling the computer system to perform the steps of the computer-implemented method; displaying, by the computer system, at least one specifically programmed hotspot template; i) where the at least one specifically programmed hotspot template permits each digital content creator of the plurality of digital content creators to define a plurality of hotspots in the particular digital content; ii) where each hotspot is an interactive visual programmed clue shown to a viewer when the viewer experiences at least one first portion of the particular digital content which allows the viewer, by selecting such hotspot to dynamically proceed to experience at least one second portion of the particular digital content; iii) where the at least one specifically programmed hotspot template is programmed to define, for each hotspot, at least the following hotspot criteria: 1) when to display such hotspot during the particular digital content, 2) where to display such hotspot in a visual area of a screen of a viewing electronic device; and 3) what to display when such hotspot is selected by the viewer; iv) where, by sequentially experiencing the at least one first portion of the particular digital content and the at least one second portion of the particular digital content, the viewer is allowed, by the computer system, to create at least one viewer personalized storyline digital experience which differs from at least one storyline digital experience pre-defined by such digital content creator of the particular digital content; enabling, by the computer system, utilizing the at least one specifically programmed hotspot template, a particular digital content creator to define at least one particular storyline digital experience based on the particular digital content, where the at least one particular storyline digital experience having a first plurality of particular hotspots; and enabling, by the computer system, a particular viewer to create at least one particular viewer personalized storyline digital experience of the particular digital content based on selecting at least one first particular hotspot from the first plurality of particular hotspots; where the at least one particular viewer personalized storyline digital experience created by the particular viewer differs from the at least one particular storyline digital experience defined by the particular digital content creator.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

DETAILED DESCRIPTION OF EXEMPLARY EMBODIMENTS

Figure 1A:
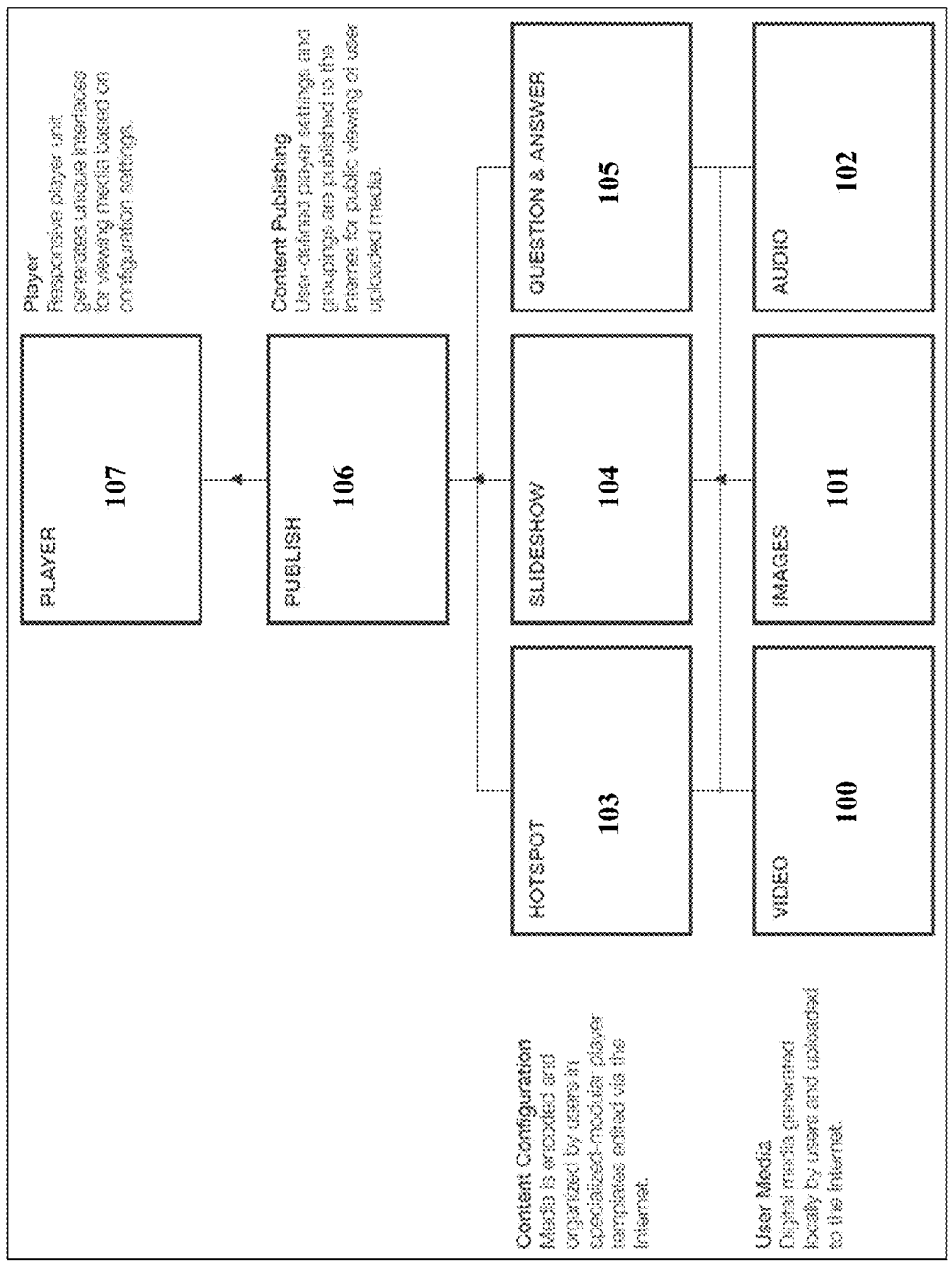
FIGS. 1A-1B show flowcharts in accordance with some embodiments of the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the description, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the terms "digital content," "content," "digital media," and "media," as referenced in this description, are used interchangeably.

In some embodiments, when the digital content is a mixture of different media (e.g., audio being played that is disconnected from visual content being played simultaneously with the audio), the instant invention provides a unified timeline for the mix of different media.

In some embodiments, the terms "creator," "generator," "digital content creator," and "digital content generator," as referenced in this description, are directed to an entity (e.g., individual, company) that creates/generates the digital content itself (e.g., a person who shots video and/or pictures, digitally records audio, draws/generates electronic art (e.g., advertisements, games, etc.), and/or uploads digital content (e.g., text, video, pictorial, audio, a combination of one of text, video, pictorial, and audio) to an electronic location (e.g., website, database, "cloud" server, etc.).

In some embodiments, the terms "viewer" and "digital content viewer," as referenced in this description, is directed to an entity (e.g., individual, company) who is not a digital content creator/generator of a particular digital content. In some embodiments, the same entity can be (1) the digital content creator/generator of a first digital content and (2) the viewer of a second digital content; where the first digital content distinct from the second digital content.

In some embodiments, the inventive specifically programmed publishing computer systems and computer-implemented publishing methods of the instant invention allow each viewer of digital content, who does not create/generate/upload the digital content itself, to dynamically and interactively arrange/view portions of the digital content in a sequence/order chosen by such viewer, resulting in a personalized nonlinear viewing experience (storytelling) created by such viewer.

In some embodiments, as shown in FIG. 1A, the inventive specifically programmed publishing computer systems/publishing platforms and computer-implemented publishing methods of the instant invention allow a content creator/user to upload the digital content (e.g., video (100), images (101), text (e.g., blog entries), audio (102), and/or a combination of at least two of video, images, and audio) to an Internet/cloud-based location and store the digital content utilizing, but not limited to, specialized-modular player templates.

In some embodiments, as shown in FIG. 1A, the inventive specifically programmed publishing computer systems and computer-implemented publishing methods of the instant invention allow the content creator/user to define one or more hotspots (103) in the digital content. In some embodiments, each hotspot (103) is an interactive visual programmed clue shown to the viewer of the digital content which allows the viewer (see e.g., FIG. 2A), by selecting a hotspot (103) (e.g., clicking on the hotspot, hovering over the hotspot, etc.), to proceed to experience (e.g., view, listen, both view and listen) another portion of the digital content. In some embodiments, the content creator/user defines when (e.g., at what time since a video or a slide show has started) and where (e.g., in what place in the viewing area (e.g., X/Y coordinates of a screen of a playing device)) the hotspots (103) are to be displayed as visual clues to the viewer of the digital content. In some embodiments, for example, one or more hotspots (103) can be displayed on timeline(s) of particular recording(s) (e.g., video recording, audio recording, slideshow, etc.), the digital content portions/pieces, and/or the unified timeline(s) of the viewer defined story(ies).

Figure 2A:
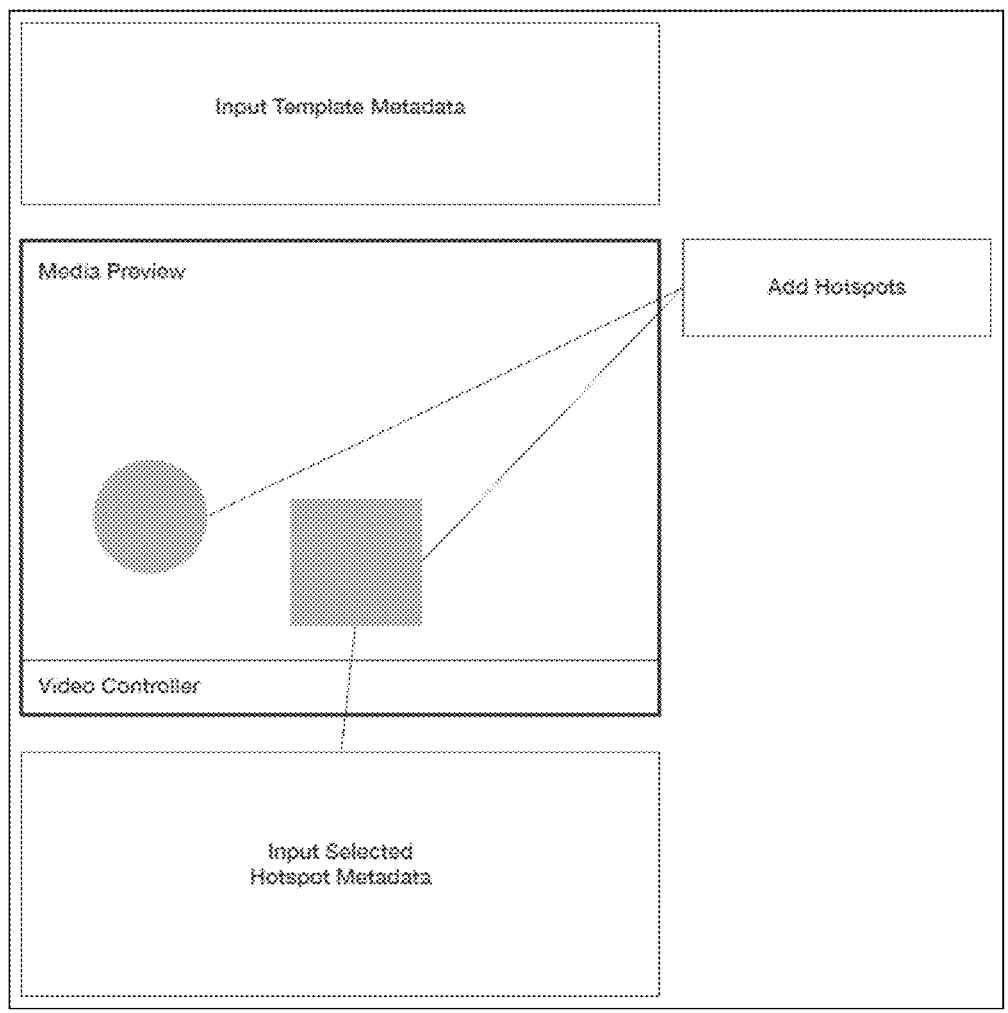
FIGS. 2A-2N show various features in accordance with some embodiments of the present invention.
Figure 2B:
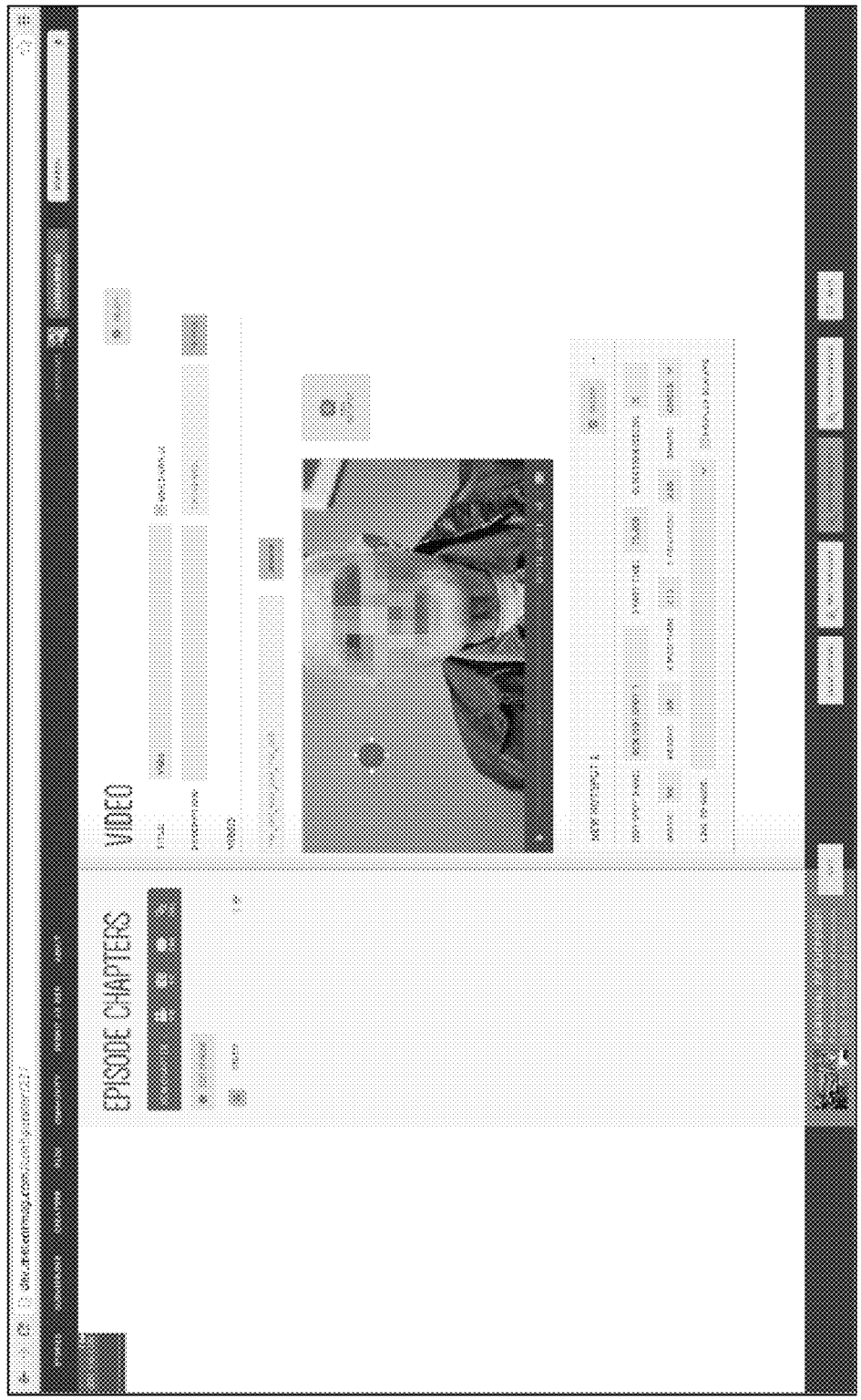
Figure 2C:
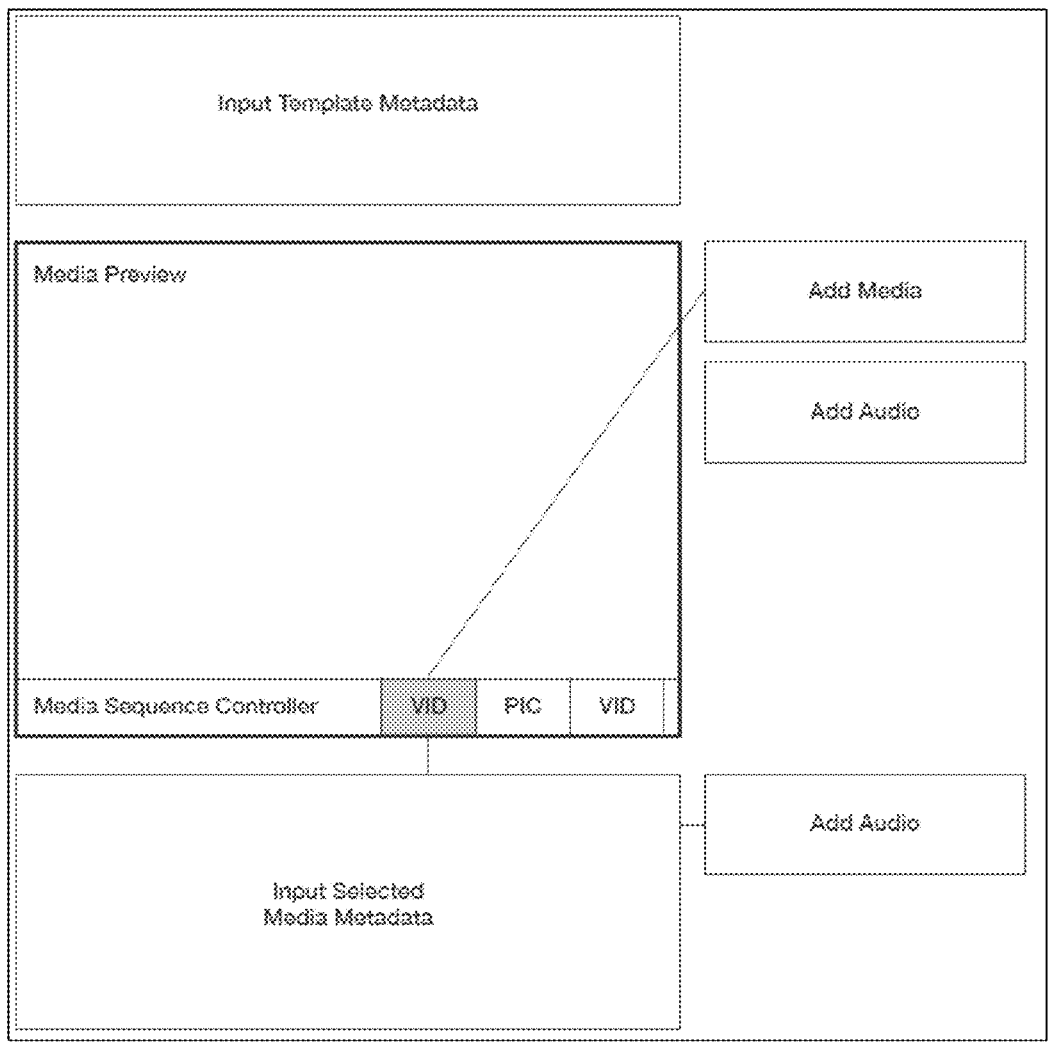
Figure 2D:
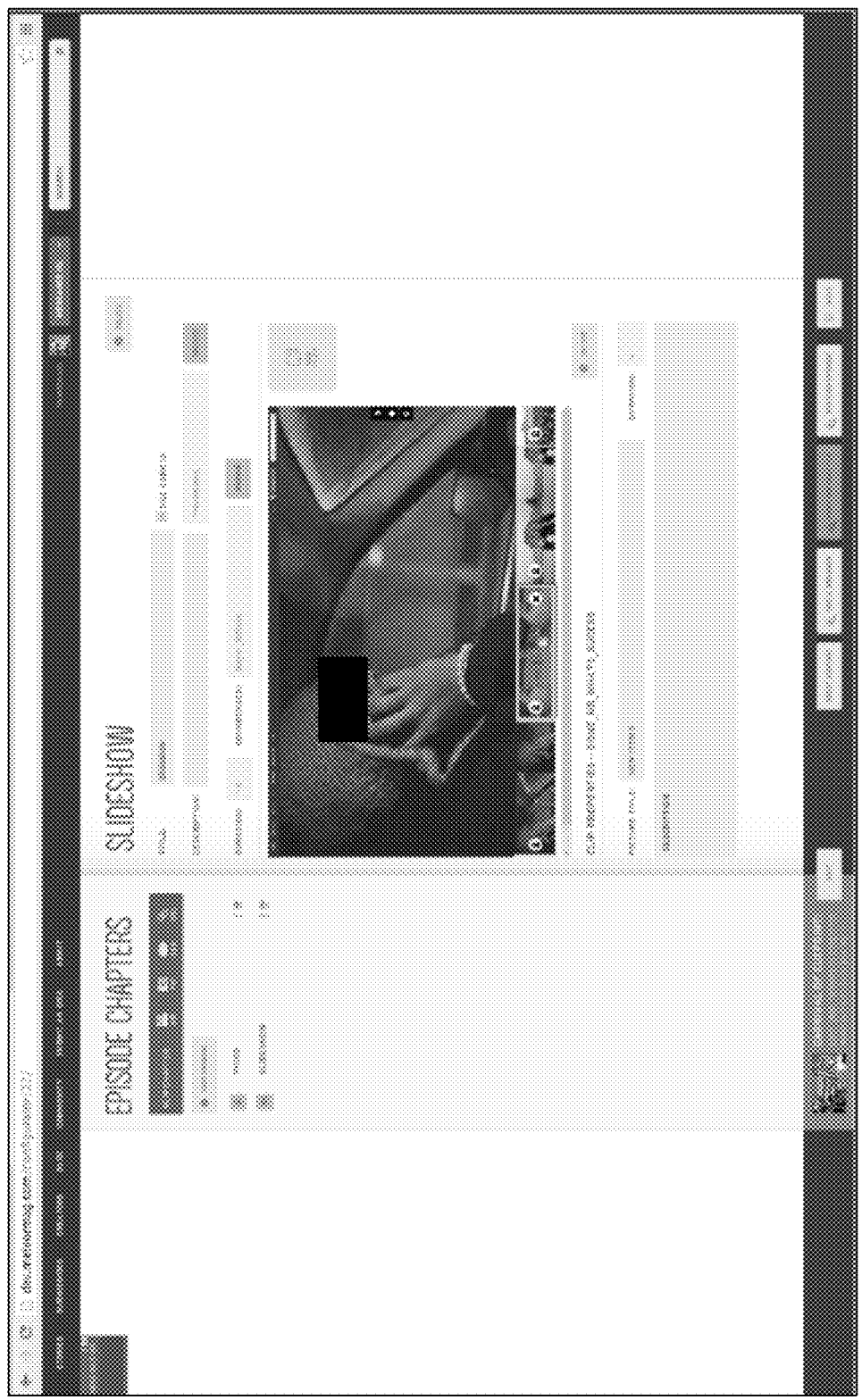

In some embodiments, as shown in FIG. 1A, the inventive specifically programmed publishing computer systems and computer-implemented publishing methods of the instant invention allow the digital content creator to define, via specifically programmed templates, but are not limited to such templates, one or more interactive slideshow experiences (104) (see e.g., FIG. 2C) and/or one or more question&answer experiences (105) (see e.g., FIG. 2D). In some embodiments, the inventive specifically programmed publishing computer systems and computer-implemented publishing methods of the instant invention process the creator's work (106) and utilizing a player module (107) (see e.g., FIG. 3A) to generate unique interfaces for viewing the digital content based on configuration setting set by the creator. In some embodiments, as shown in FIG. 1A, the programmed and processed interfaces (107) with creator-defined settings and grouping are published for the viewers and to be interactively viewed by viewers utilizing specifically programmed interfaces(s).

In some embodiments, the inventive specifically programmed publishing computer systems and computer-implemented publishing methods of the instant invention allow the content creator/user to organize the digital content in a hierarchical nesting classification by defining series (the most top level category), stories, chapters, and/or subchapters (the lowest level category). In some embodiments, the hotspots allow the viewer of the digital content to move around in the digital content in any direction (e.g., one-to-one, one-to-many, many-to-many) in the hierarchical nesting classification—e.g., from series to subchapter(s), from subchapter(s) to series, from series to chapter(s), from chapter(s) to series, from story(ies) to subchapter(s), from story(ies) to subchapter(s), etc.

Figure 1B:
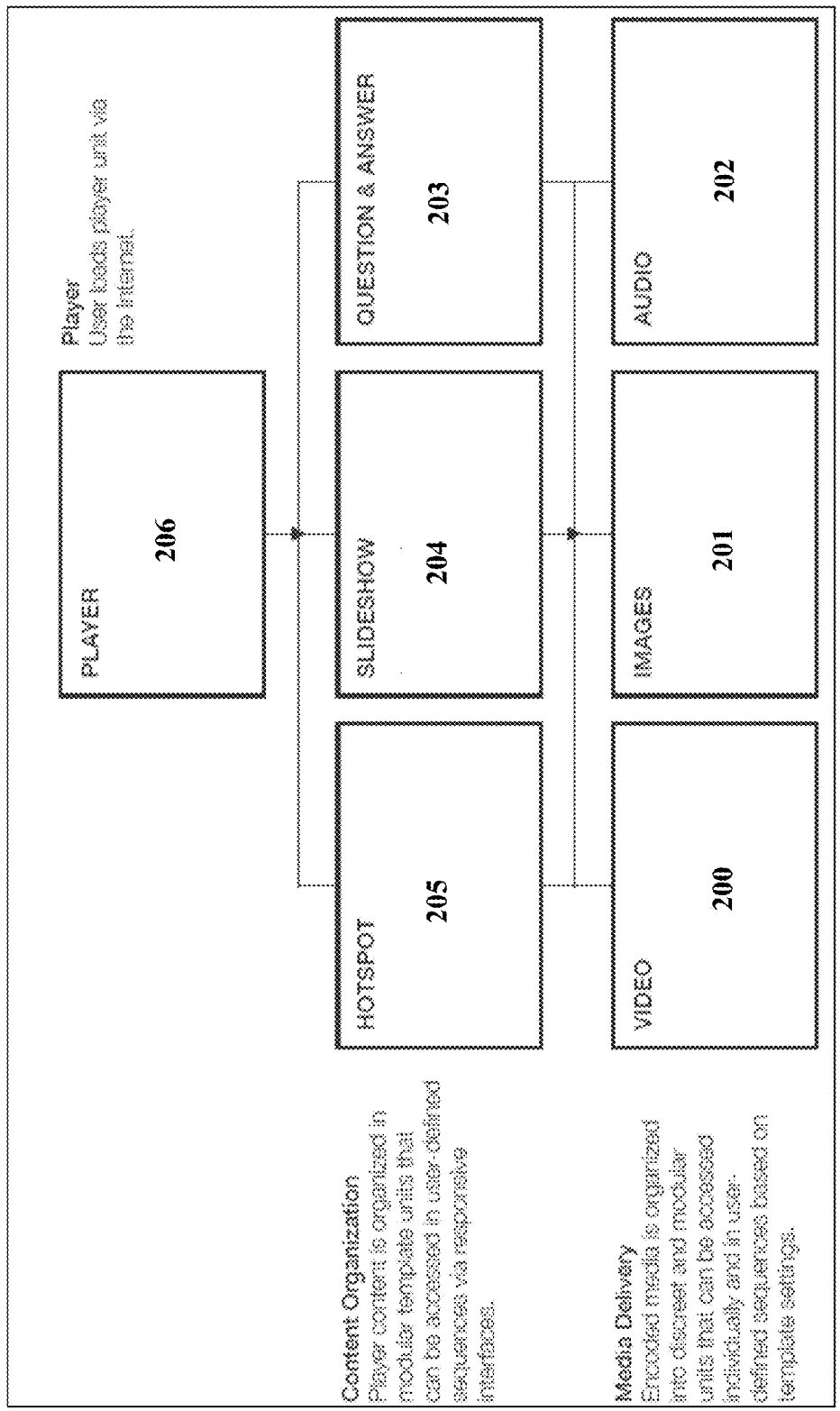

In some embodiments, FIG. 1B shows how the viewers can experience the published digital content. In some embodiments, for the viewers, the encoded digital medial is organized into discreet and modular units that can be accessed individually and in user-defined sequences based on template settings to allow each viewer to create own personalize storytelling experience.

In some embodiments, the inventive specifically programmed publishing computer systems and computer-implemented publishing methods of the instant invention allows the creators to specifically program the digital content such that the chapters offer the viewers a passive storytelling experience and subchapters offer the viewer an active experience (e.g., viewers can deviate from).

In some embodiments, FIGS. 2A-2B, show illustrative examples of how the hotspots can be defined/configured by the digital content creator in accordance with the instant invention. In some embodiments, the hotspot configuration tool allows the content creators to generate interactive shapes on a single encoded video-type file via a specifically programmed custom graphical user interface. In some embodiments, the inventive specifically programmed publishing computer systems and computer-implemented publishing methods of the instant invention include the software interface that allows the content creators to customize the shapes, sizes, start-time and duration of the hotspots using, for example, but is not limited to, the video controller and/or metadata input areas. In some embodiments, areas defined by the hotspots can be interacted with via a player during defined times to access new content via a specifically programmed custom hyperlink interface. In some embodiments, the hotspots can be configured to be pointed to related-completed template units via pull-down menus(es) and/or to external documents via a specifically programmed custom hyperlink tool(s).

In some embodiments, FIGS. 2C-2D show illustrative examples of how the slideshows can be defined/configured by the digital content creator in accordance with the instant invention. In some embodiments, the inventive specifically programmed publishing computer systems and computer-implemented publishing methods of the instant invention include a slideshow configuration tool that allows the digital content creators to generate interactive slideshows using, for example, but not limited to, encoded video, image, text, and/or audio-type media via a specifically programmed custom graphical user interface. In some embodiments, the inventive specifically programmed publishing computer systems and computer-implemented publishing methods of the instant invention include a software interface that generates a summed timeline from overlapping creator-defined media without overwriting the original source media. In some embodiments, the inventive specifically programmed publishing computer systems and computer-implemented publishing methods of the instant invention allow the content viewers to access and navigate through the source media via a specifically programmed custom user interface without disrupting the creator-defined media relationships. In some embodiments, the instant invention allows the content creators to freely mix video and/or image media types within the drag-and-drop media sequence controller interface and/or adjust selected-media durations in metadata input areas.

Figure 2E:
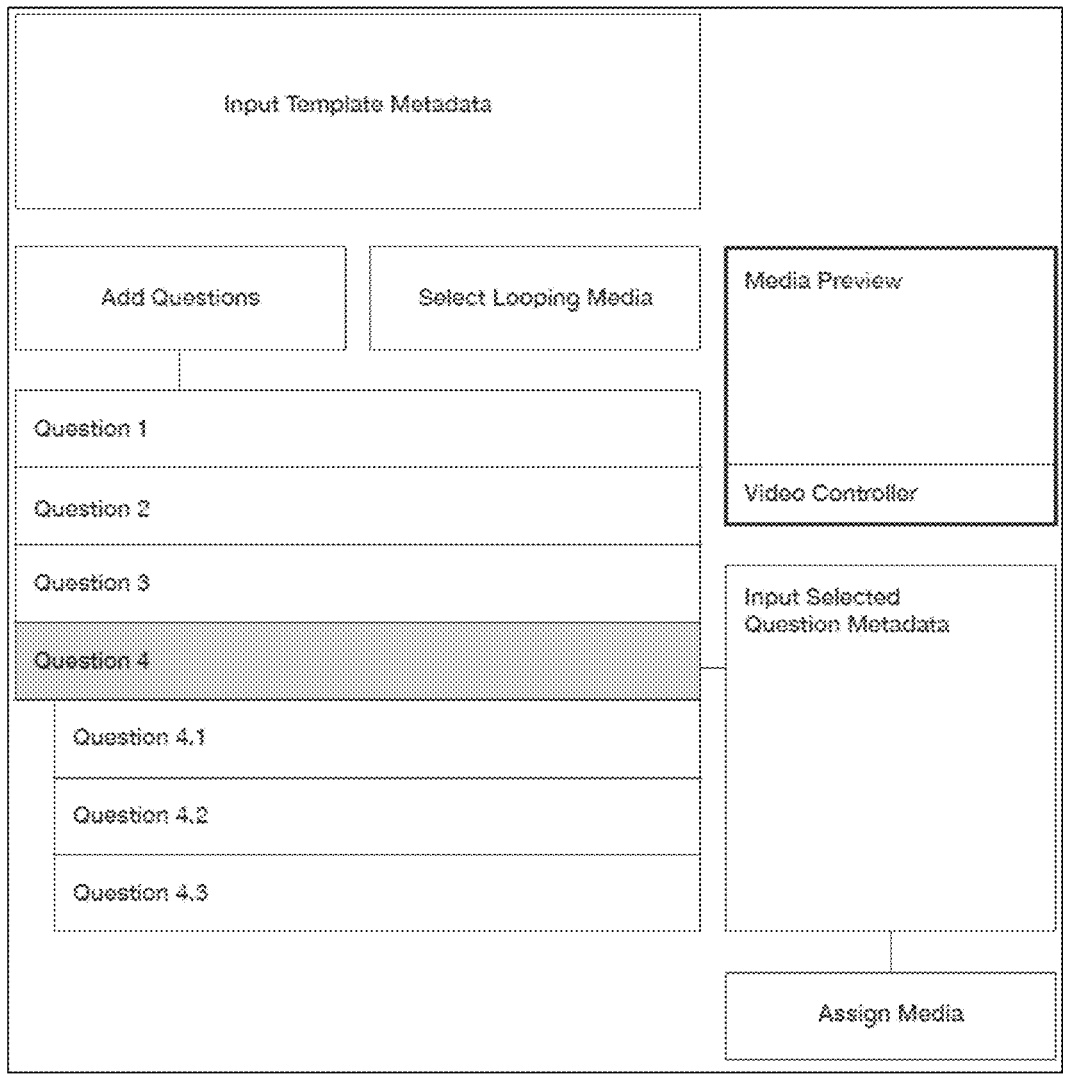
Figure 2F:
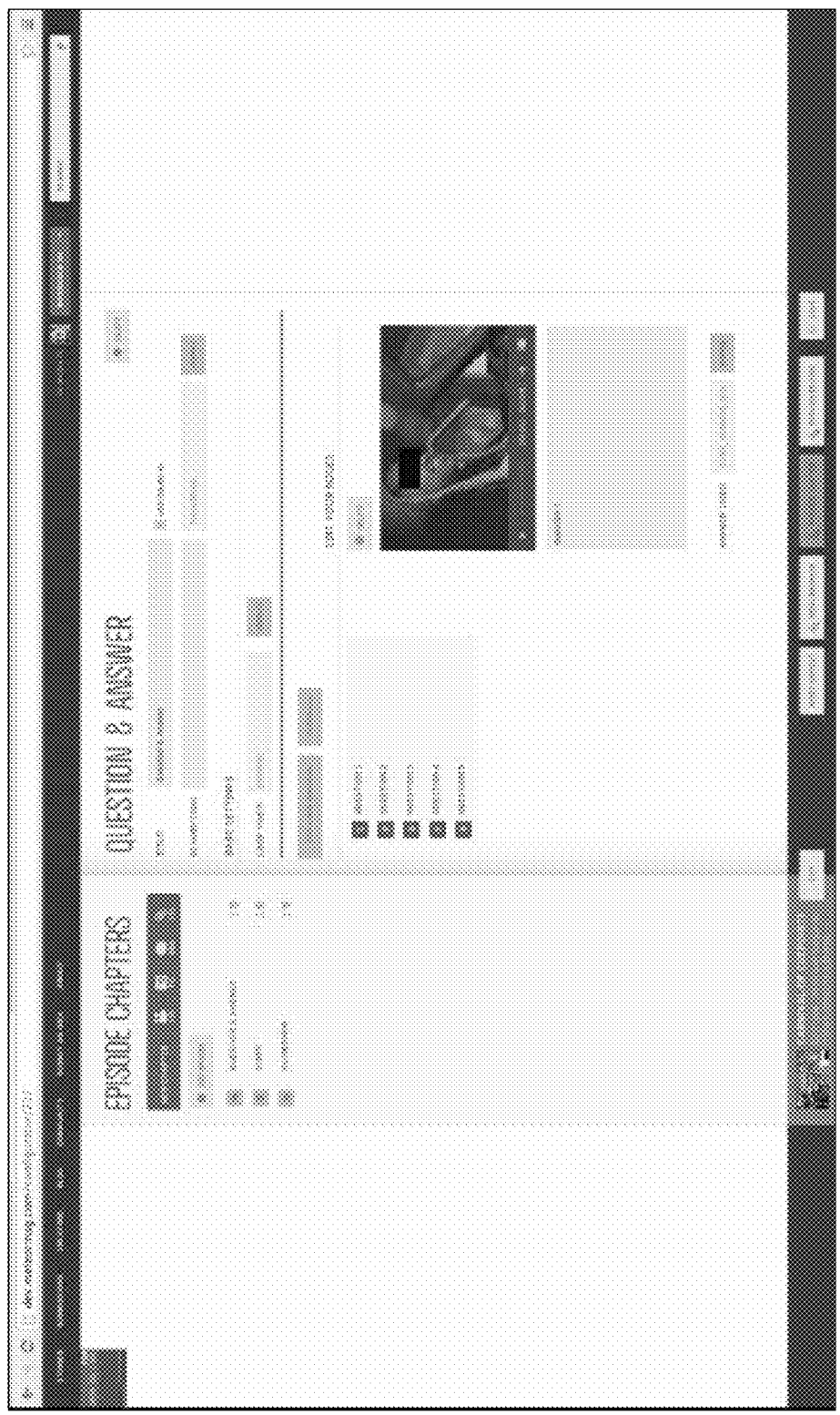

In some embodiments, FIGS. 2E-2F show illustrative examples of how the question&answer content can be defined/configured by the digital content creator in accordance with some embodiments of the instant invention. In some embodiments, the inventive specifically programmed publishing computer systems and computer-implemented publishing methods of the instant invention include a specifically programmed Question & Answer configuration tool that allows the content creators to organize complex media relationships to simulate discussion and/or explanation via a specifically programmed custom graphical user interface. In some embodiments, the inventive specifically programmed publishing computer systems and computer-implemented publishing methods of the instant invention include a specifically programmed software interface that can generate creator-defined question menus(es) over a looping video/audio clip. In some embodiments, the instant invention allows the creator to assign video/audio responses to each created question and organize question order (e.g., hierarchy and/or wording) via a specifically programmed custom drag and drop interface.

Figure 2G:
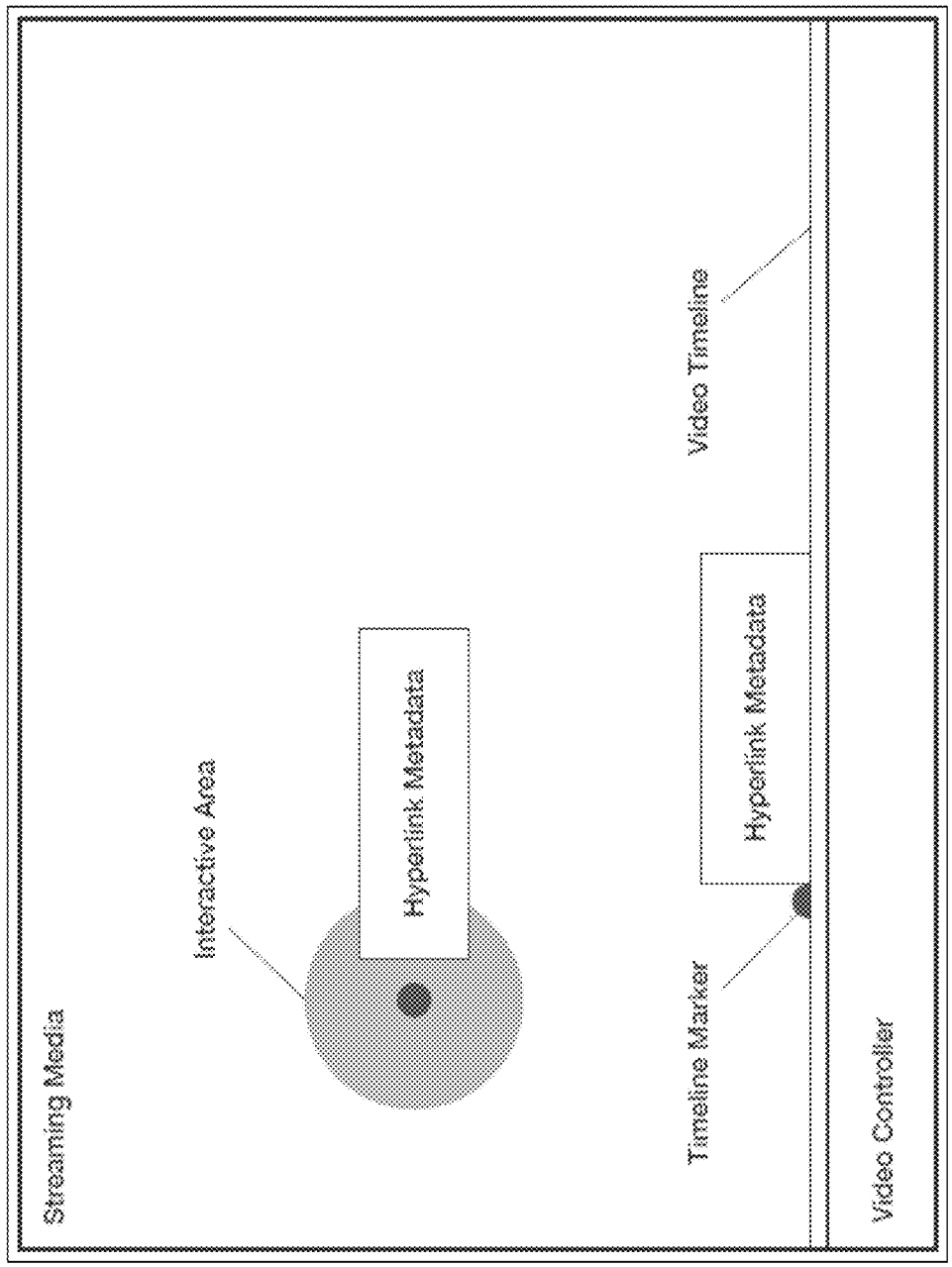
Figure 2H:
Figure 21:

FIGS. 2G-2I show illustrative examples of how an exemplary Hotspot user interface allows the content viewers to deviate from the linear content presentation timeline (e.g., video timeline) via interactive shapes overlayed on, for example, streaming video in accordance with some embodiments of the invention. In some embodiments, by touching/clicking/hovering a mouse over the hotspot-defined areas during defined times can display metadata for hyperlinks to related template units and/or custom descriptions for external hyperlinks. In some embodiments, by interacting with these description units associated with the hotspots, the instant invention allows the content viewers to be presented with the content at the embedded hyperlink destination(s). In some embodiments, the hotspots can be defined/programmed such that the same hotspot (e.g., the same active area on a screen) can be directed to different contents (e.g., different subchapters, documents) at different times. In some embodiments, the inventive specifically programmed publishing computer systems and computer-implemented publishing methods of the instant invention analyze an electronic device of a viewer to determine presentational characteristics of such device (e.g., at least one of a screen resolution, screen width, etc.) and then adjust the digital content for the improved presentation quality and consistency (e.g., adjust the timeline size relative to the width of the screen, position of a hotspot, etc.).

In some embodiments, the inventive specifically programmed publishing computer systems and computer-implemented publishing methods of the instant invention includes keep track of how much content have been viewed/consumed by the viewer.

In some embodiments, the hotspot start times can also be permanently referenced in the content presentation timeline (e.g., video timeline) by specifically programming the video controller/video player to display them. In some embodiments, the instant invention allows the viewers to interact with timeline markers at any time—regardless of hotspot defined durations—while the digital content (e.g., video) is shown/streaming.

Figure 2J:
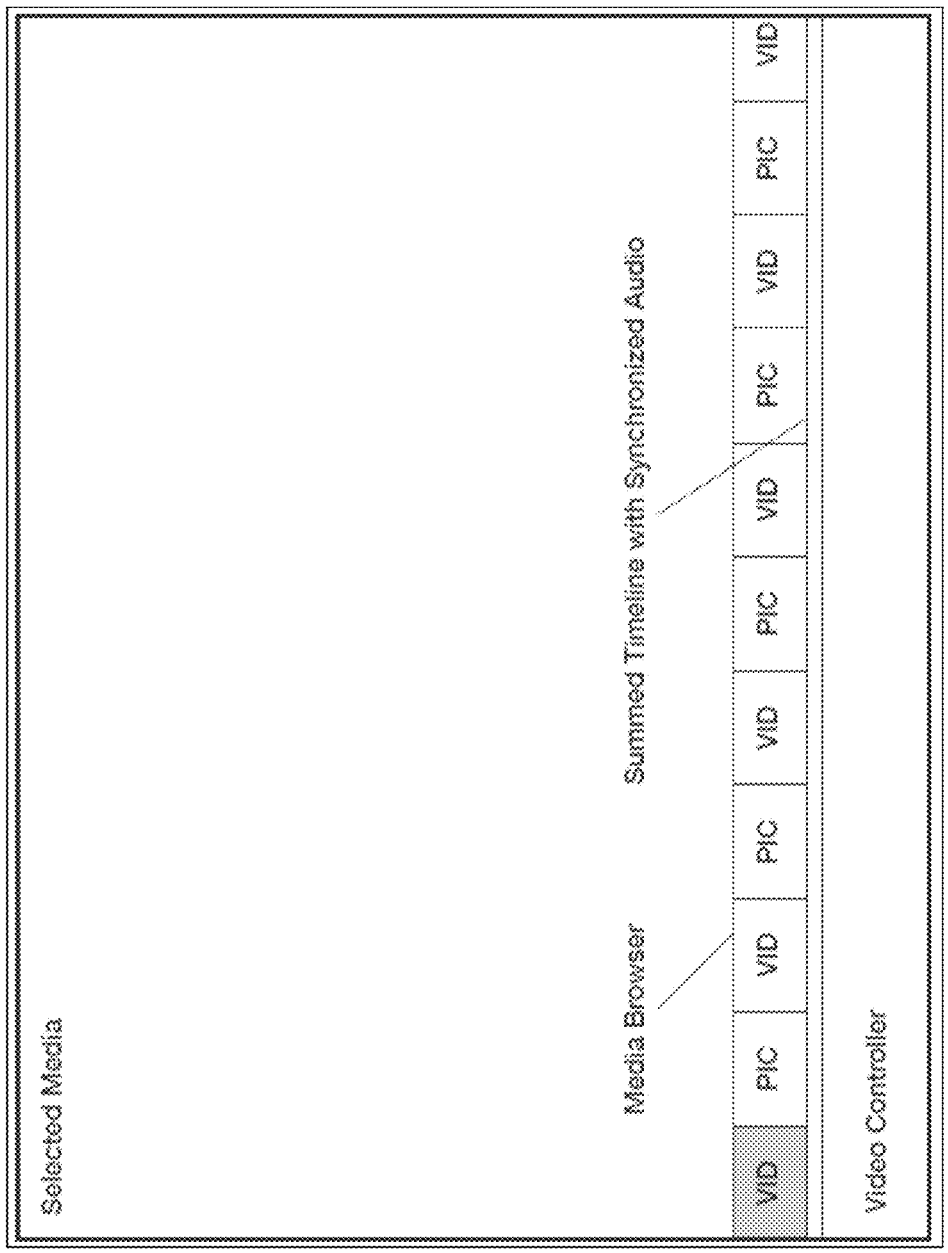
Figure 2K:
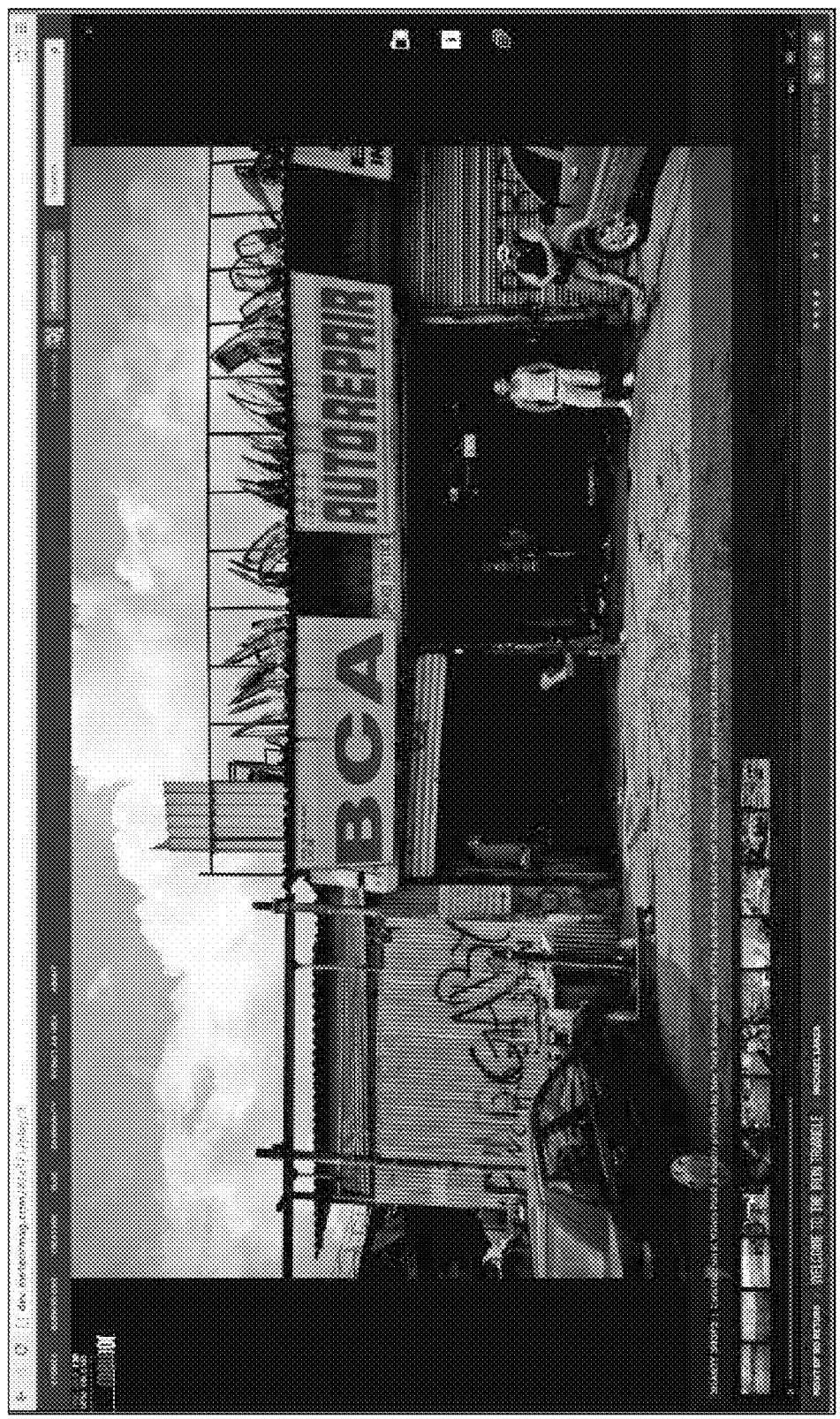

In some embodiments, the inventive specifically programmed publishing computer systems and computer-implemented publishing methods of the instant invention utilize a flexible abstract ratio mechanism for programming hotspots so that the same hotspot is placed in the same spot with respect to displayed content by determining technical characteristics of a device and/or software utilized by the viewers to access the digital content FIGS. 2J-2K show illustrative examples of how an exemplary Slideshow user interface allows the content viewers to browse multiple media types on a unified timeline in accordance with some embodiments of the invention. In some embodiments, the inventive specifically programmed publishing computer systems and computer-implemented publishing methods of the instant invention allow the content viewers to experience a passive linear presentation of media and/or interact with individual raw content via a specifically programmed media browser interface. In some embodiments, the content viewer's individual media selections via the media browser will advance a summed timeline, including any embedded independent audio tracks. In some embodiments, the viewable media types include both images and streaming video.

Figure 2L:
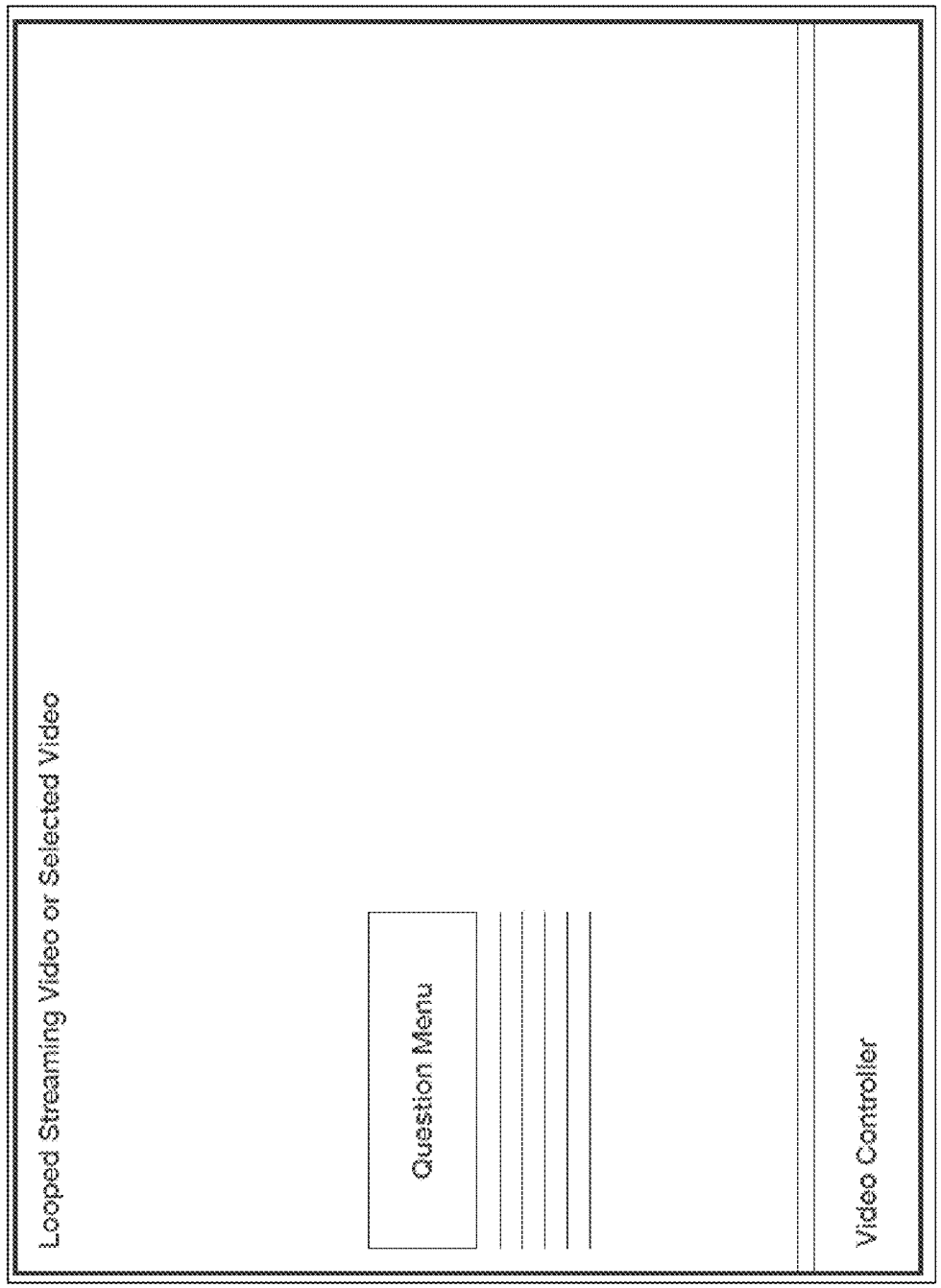
Figure 2M:
Figure 2N:

FIGS. 2L-2N show illustrative examples of how an exemplary Question & Answer interface allows the content viewers to organize and/or display complex video relationships via responsive overlayed menus(es). In some embodiments, an exemplary menus can include a main branch of user-defined length with two subordinate branches of fixed maximum lengths. In some embodiments, the subordinate branches are revealed based, at least, on settings defined during the Q&A configuration by the creator (FIG. 2E). In some embodiments, the inventive specifically programmed publishing computer systems and computer-implemented publishing methods of the instant invention allow the viewer to built his or her own interview by interactively selecting questions for the interview. In some embodiments, the inventive specifically programmed publishing computer systems and computer-implemented publishing methods of the instant invention allow the menus selections seamlessly swap out onscreen content (e.g., video) with content (e.g., video) attached to the selected question(s). In some embodiments, when no selection is made and/or when the playing of a selected content (e.g., video) is completed, a looping video is displayed onscreen. In some embodiments, no subquestions are shown until a viewer selects (e.g., clicks, hovers over) the top question. In some embodiments, the inventive specifically programmed publishing computer systems and computer-implemented publishing methods of the instant invention allows the viewers to add/post feedback and/or follow-up questions to the interviewer.

Figure 3A:
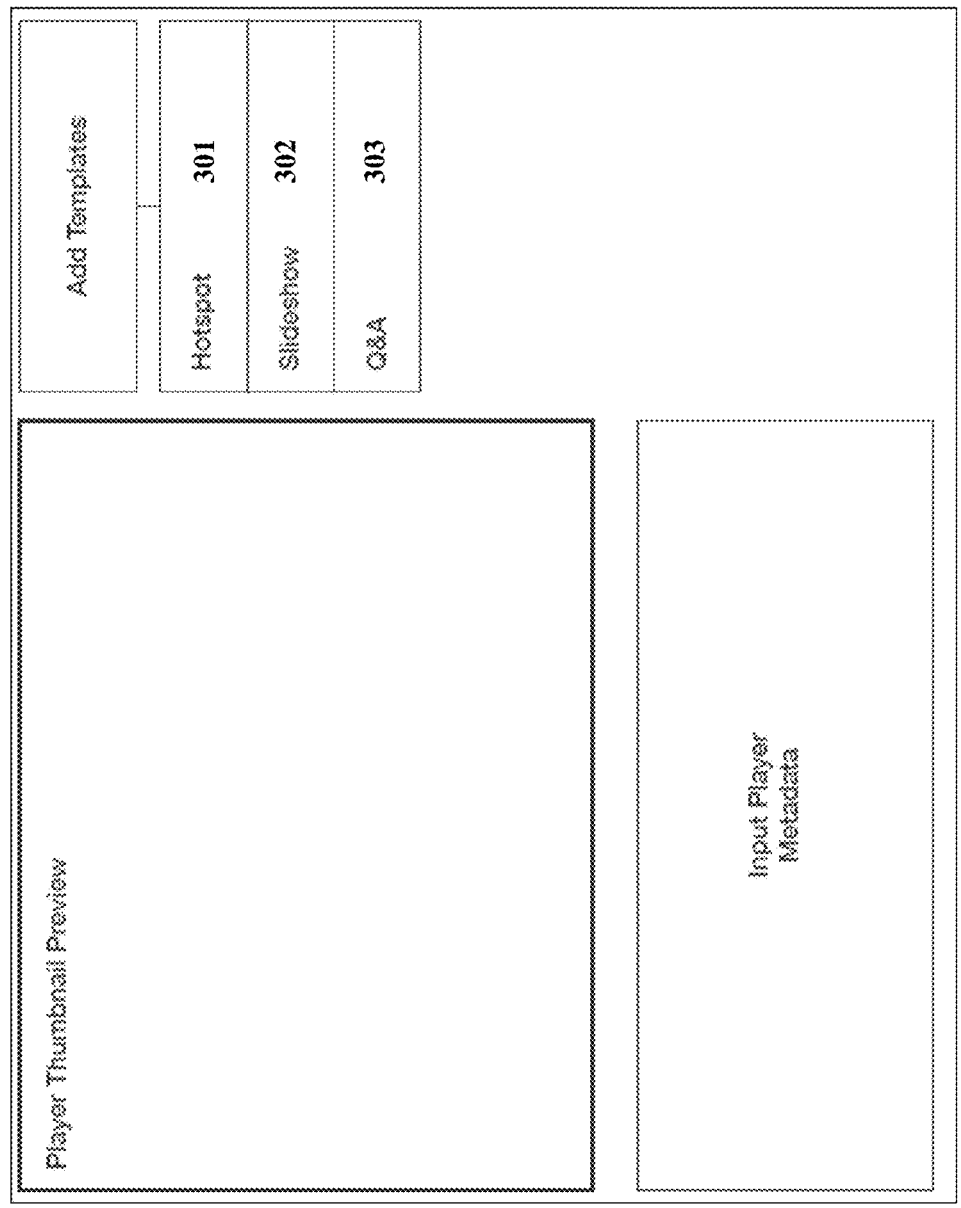
FIGS. 3A-3D show various features in accordance with some embodiments of the present invention.
Figure 3B:
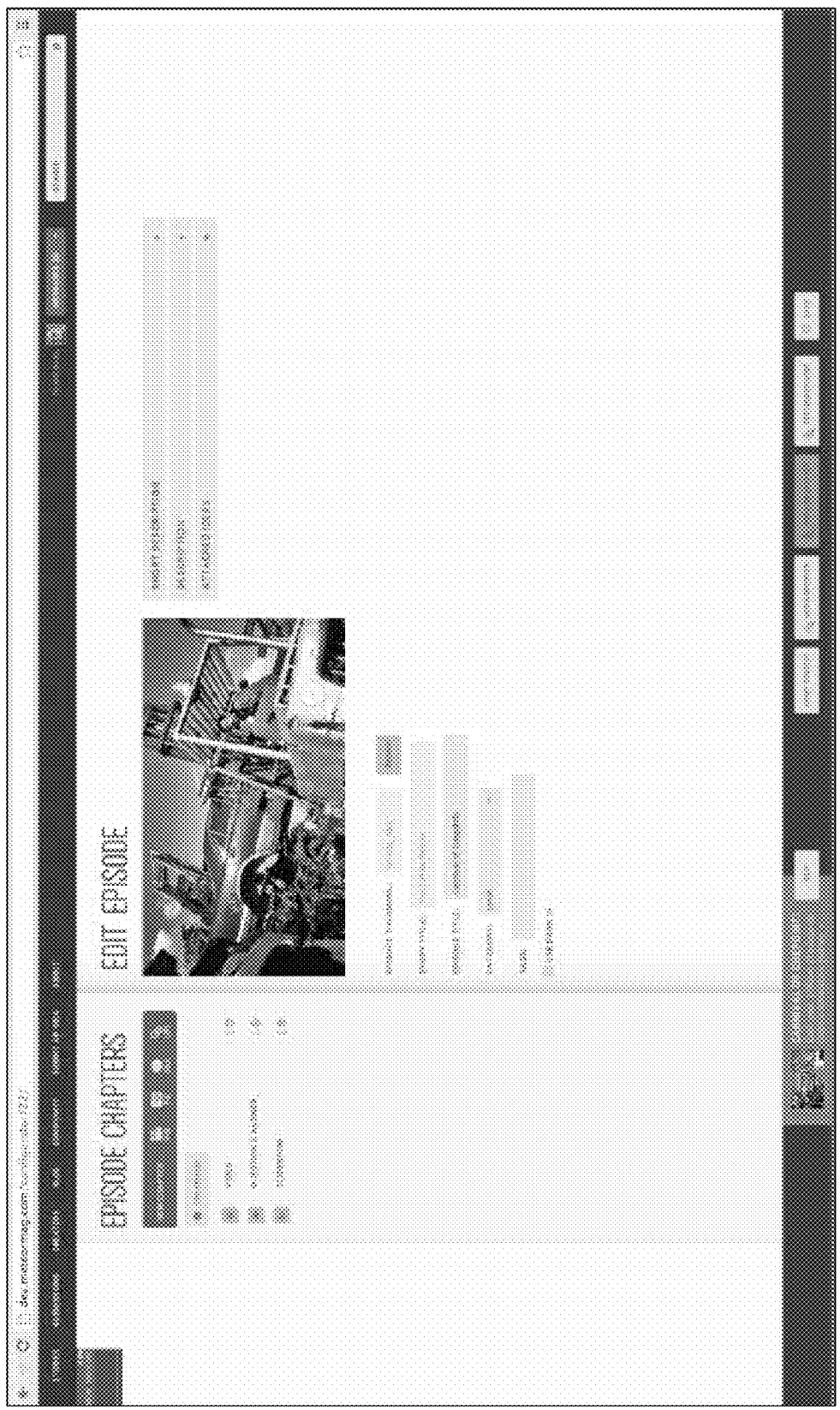

FIGS. 3A-3B show illustrative examples of how an exemplary player unit which can include at least one interactive template in accordance with some embodiments of the instant invention. In some embodiments, the inventive specifically programmed publishing computer systems and computer-implemented publishing methods of the instant invention include a specifically programmed custom drag and drop user interface which allows the content creators to organize and/or edit the templates and associated media. In some embodiments, upon publishing, all template and player metadata and core media assets are packaged into one unit and distributed via the Internet.

Figure 3C:
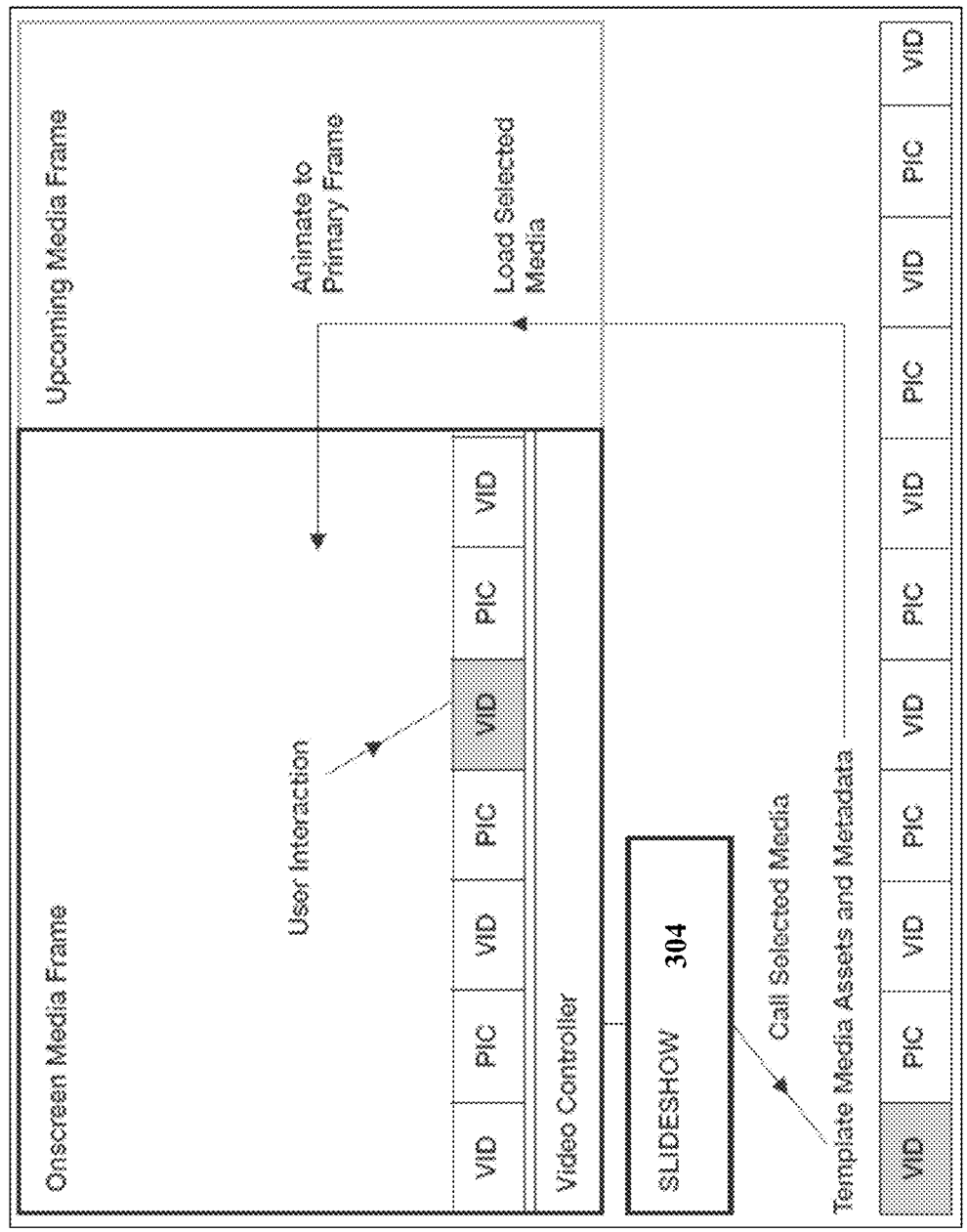
Figure 3D:
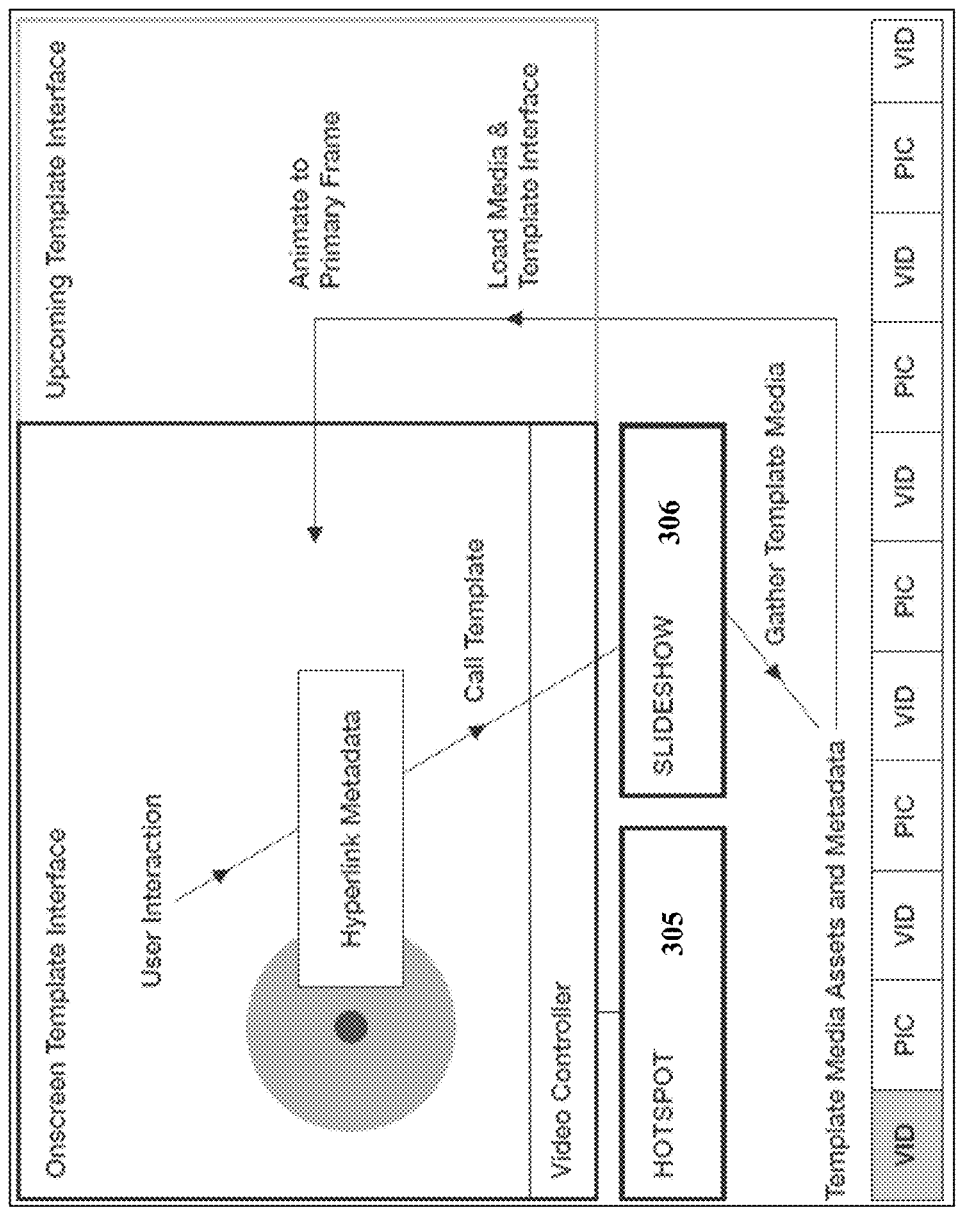

FIGS. 3C and 3D show illustrative examples of how an exemplary player user interface, that interacts with the content viewer-user, uses a dual content-frame system to seamlessly transition from one media asset to another. In some embodiments, upon loading a player unit, links to all user-defined core media assets and metadata are loaded and displayed on the viewer's Internet-connected device. In some embodiments, the programmed links can include at least one of 1) initial image(s) and/or initial video frame(s), and 2) image and/or text metadata for each template included in the player unit.

As shown in FIG. 3C, in some embodiments, when the viewers interact with onscreen links and/or buttons that require changing media assets, the requested media is loaded into the secondary offscreen frame and then animated into the primary frame position. As shown in FIG. 3D, in some embodiments, when the viewers interact with onscreen links and buttons that require changing template interfaces, the requested template interface and initial media assets are loaded into the secondary offscreen frame and then animated into the primary frame position.

In some embodiments, a story can be programmed to have an option of becoming a series (serialization). In some embodiments, the series is an open-ended story creation by the viewer.

Figure 4:
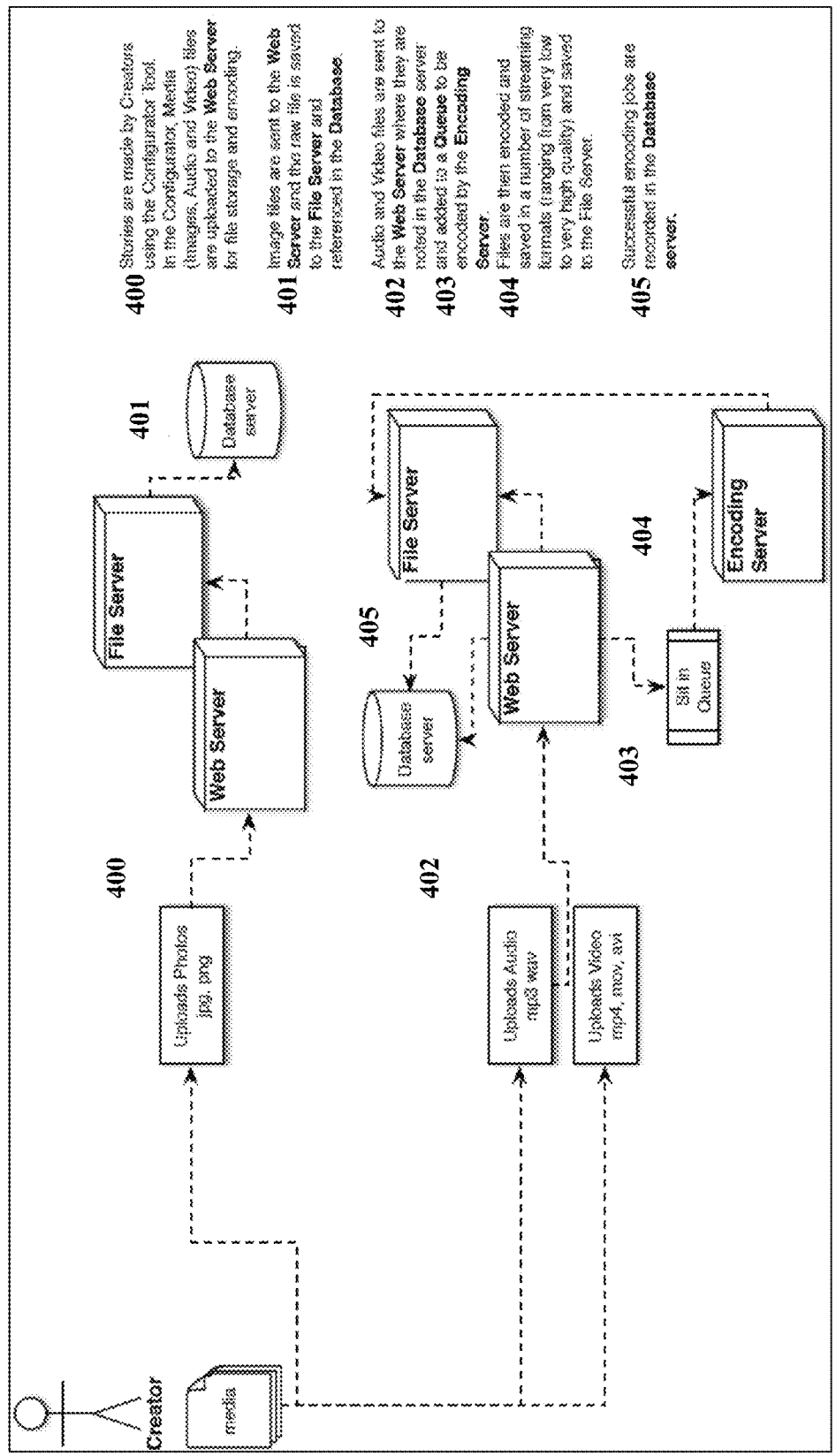
FIGS. 4-9 illustrates exemplary computer architectures in accordance with some embodiments of the present invention.

FIG. 4 shows an illustrative data flowchart for uploading the digital content by the creators in accordance with some embodiments of the instant invention.

Figure 5A:
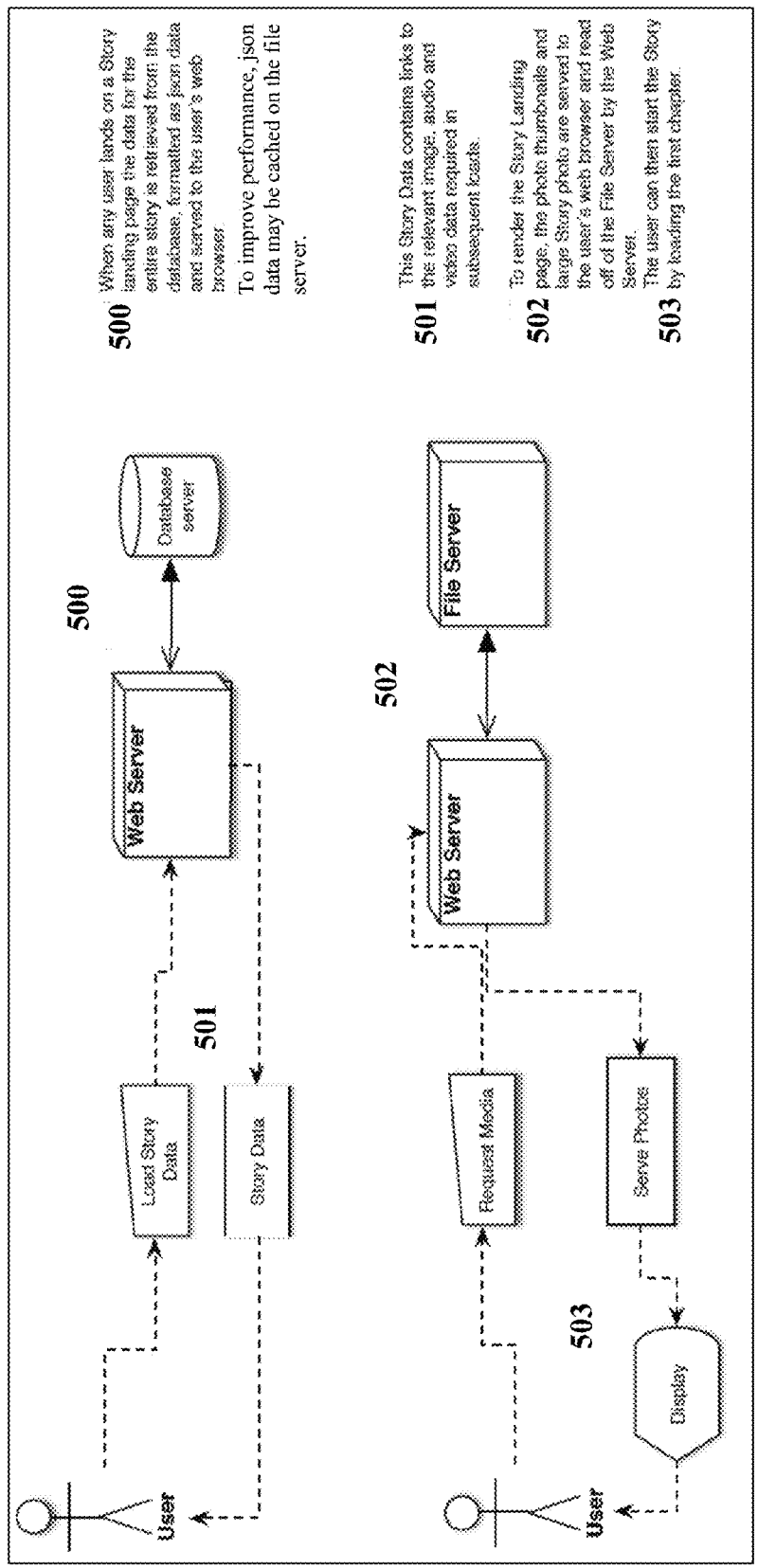
Figure 5B:
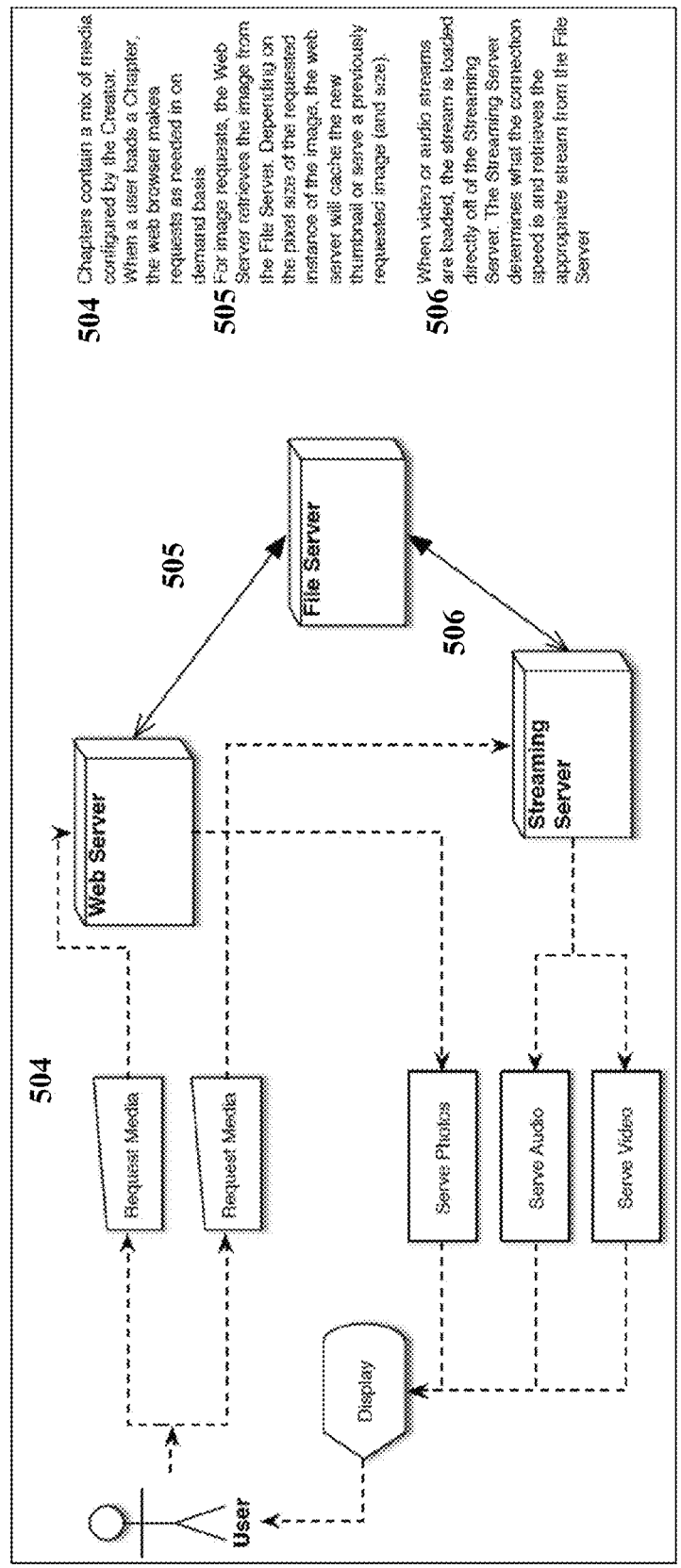

FIGS. 5A and 5B show illustrative data flowcharts for how the viewers personalize their storytelling experiences of the digital content published in accordance with some embodiments of the instant invention.

In some embodiments, the inventive specifically programmed publishing computer systems and computer-implemented publishing methods of the instant invention incorporate at least one of the social media content, social media tools, and social networking to build support for creators' contributions and/or viewers' experiences. In some embodiments, the inventive specifically programmed publishing computer systems and computer-implemented publishing methods of the instant invention is programmed to receive submissions from public, the viewers, and/or creators/contributors.

In some embodiments, the inventive specifically programmed publishing computer systems and computer-implemented publishing methods of the instant invention allow the viewers to vote for and/or against the digital content of particular creator(s). In some embodiments, the voting is limited to non-registered public. In some embodiments, the voting is limited to the registered viewers. In some embodiments, the voting is limited to the registered creators/contributors.

In some embodiments, the inventive specifically programmed publishing computer systems and computer-implemented publishing methods of the instant allows editorial review of the published and/or pre-published digital content.

In some embodiments, the inventive specifically programmed publishing computer systems and computer-implemented publishing methods of the instant invention allows the creators to be paid (e.g., automatically paid, paid on ad hoc basis, etc.).

In some embodiments, the inventive specifically programmed publishing computer systems and computer-implemented publishing methods of the instant invention allows the viewers to contextually navigate through the digital content and over the presentation timeline (e.g., moving a cursor to display times).

In some embodiments, the inventive specifically programmed publishing computer systems and computer-implemented publishing methods of the instant invention can be utilize for instructional content (e.g., tutorials, etc.).

In some embodiments, the inventive specifically programmed publishing computer systems and computer-implemented publishing methods of the instant invention keep portions of a single story as discrete units (i.e., not combined in a single file).

In some embodiments, the inventive specifically programmed publishing computer systems and computer-implemented publishing methods of the instant invention allows to publish sponsored story(ies) (e.g., news, advertisement) with hotspots strategically place to, for example, supply additional information and/or allow a viewer to perform a particular action related to, for instance, a particular advertisement (e.g., an advertisement for milk has a hotspot placed on a carton of milk and selecting the hotspot by a viewer results in (1)

display a story about how cows are fed, (2) allowing to purchase a carton of milk at a local grocery, etc).

In some embodiments, the inventive specifically programmed publishing computer systems and computer-implemented publishing methods of the instant invention allows to measure the viewer's interaction with the digital content by measuring, for example, but is not limited to, amount of time spend, etc.

In some embodiments, the inventive specifically programmed publishing computer systems and computer-implemented publishing methods of the instant invention can be utilized for online education (e.g., presenting a lecture as a story); tutorials (e.g., how to conduct a surgery); presenting legal documents (e.g., interactive annotated transcripts of depositions and/or court hearings.

Figure 10:
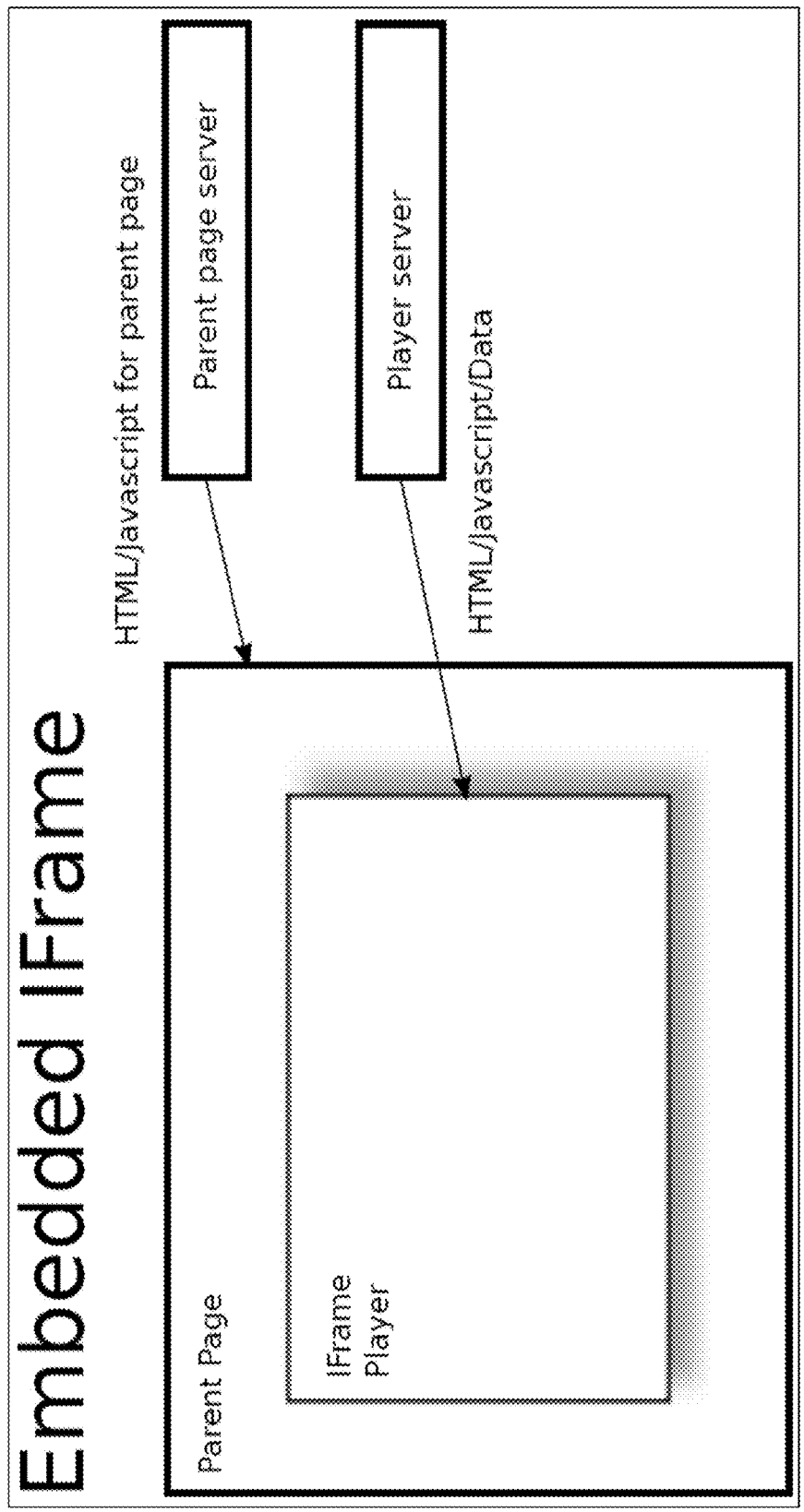
FIGS. 10-11 show various features in accordance with some embodiments of the present invention.

In some embodiments, as shown in FIG. 10, the inventive specifically programmed publishing computer systems and computer-implemented publishing methods of the instant invention utilize a technique for embedding players by having the player server to serve the entire player as a separate page which is then included in the parent page as an iframe. In such embodiments, technically, the player is a separate page from the parent.

Figure 11:
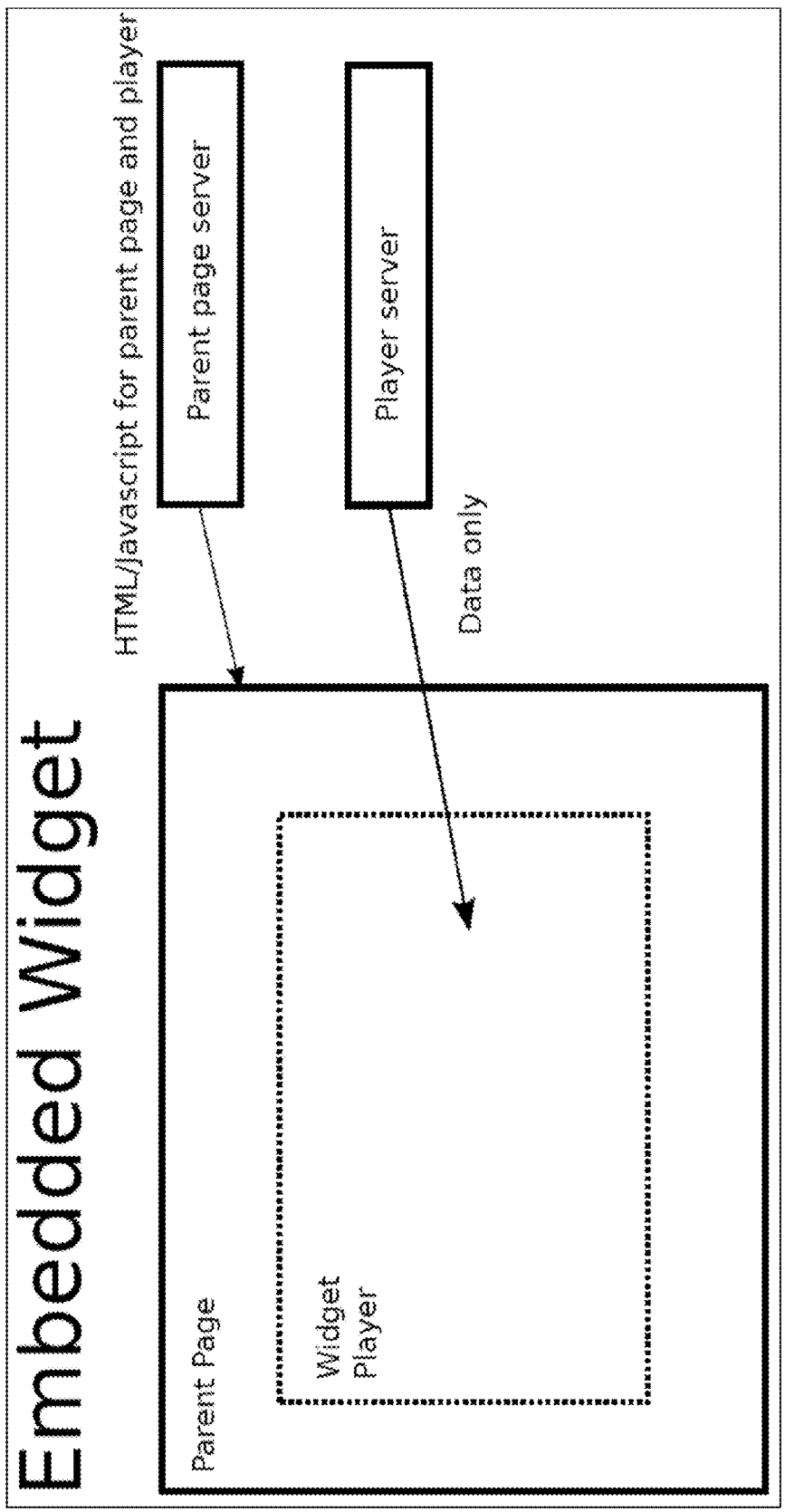

In some embodiments, as shown in FIG. 11, the inventive specifically programmed publishing computer systems and computer-implemented publishing methods of the instant invention utilize a technique for embedding player(s) using a widget. For example, in some embodiments, the HTML and/or Javascript for the widget is supplied by the parent page. In some embodiments, the inventive specifically programmed publishing computer systems distribute a Javascript library and, optionally, guidelines on for how to configure the parent page to include the player. In such scenario, from a technical standpoint the player is in the same page as the parent. In some embodiments, the player widget retrieves only the data from the player server rather than the entire page. In some embodiments, the inventive specifically programmed publishing computer systems and computer-implemented publishing methods of the instant invention can utilize varies techniques for embedding embedding player(s) using a widget, such as exemplary techniques detailed in U.S. Pub. No. 20110238688 whose specific description of widget(s) is hereby incorporated by reference in its entirety; but the use of the exemplary widget techniques by the inventive specifically programmed publishing computer systems and computer-implemented publishing methods of the instant invention are not limited to the specific description of them in U.S. Pub. No. 20110238688.

In some embodiments, utilizing the player widget allows to create a unified experience for the user by providing capabilities to style the player allowing to present the player's interface as though it is an integral part of the parent page. In some embodiments, utilizing the player widget allows for deeper integration between the parent and player. For example, the parent page can change the layout quite drastically such as, inter alia, to change the way navigation works through building a chapter menu outside of the player.

In some embodiments, the inventive specifically programmed publishing computer systems allow viewers/readers to resyndicate content. For example, the widget can expose the ability for viewers of the widget to generate embed strings that allow viewers to view content on their own web sites. For example, the inventive specifically programmed publishing computer systems may display an embed string below the content and/or a link/button to retrieve an appropriate embed string for displaying the content on the viewer's web site. In some embodiments, a content author may provide a web site where potential syndicators can request to become affiliated with the content author so that the syndicator can display the author's content with fewer advertisements and/or with a customized appearance. For example, the author may allow syndicators to pay a periodic fee (e.g., hourly, daily, weekly, monthly, and etc.) for the privilege of displaying the author's content with fewer restrictions.

In some embodiments, the inventive specifically programmed publishing computer systems described herein can operate in many different scenarios, including on mobile devices from which users are more and more using to access content. For example, a publisher of a news or other service for a mobile device may retrieve content from one or more authors using the techniques described herein, and authors may receive payment for use of their content wherever the content goes. In addition, advertisers may contract with the author to have advertisements accompany the content wherever the content is displayed so that advertisers can associate their products with specific content items rather than more broadly with particular publisher's sites.

In some embodiments, the content distribution system may include configurable restrictions related to video in addition to others described herein. For example, a content author may provide a player widget for playing video provided by the author, but may allow certain publishers to access the author's content and use their own video player to play the content. For example, it is typical for sites, such as YouTube, to attempt to force playback in a particular player that allows for branding and other functionality (e.g., subsequent videos after one video finishes) to be enforced. In some embodiments, the content author may impose similar restrictions on content through an author-provided player but may also relax such restrictions for a publisher that pays to display the publisher's own branding or other functionality.

In some embodiments, the inventive specifically programmed publishing computer systems provide the ability for publishers to enforce exclusive content with publishers. For example, an author and publisher may agree that the publisher will get an exclusive right to use the content for a set period of time for a particular fee. In some embodiments, the inventive specifically programmed publishing computer systems can request identifying information from each publisher and compare that information with rights stored in one or more content stores to determine whether a particular requesting publisher has access to requested content, and to provide content only to those publishers having sufficient rights. In some embodiments, such exclusivity may be time limited. For example, an author may provide his content to an affiliate exclusively for 24 hours and then after 24 hours to any publisher.

Illustrative Operating Environments

In some embodiments, the innovative programmed systems can be operated over other operating systems, such as, but not limited to, iOS and Android. In some embodiments, the innovative programmed systems can be native to a software platform and/or incorporate programing modules based at least in part on HTML5-based tools like PhoneGap or Sencha.

Figure 6:
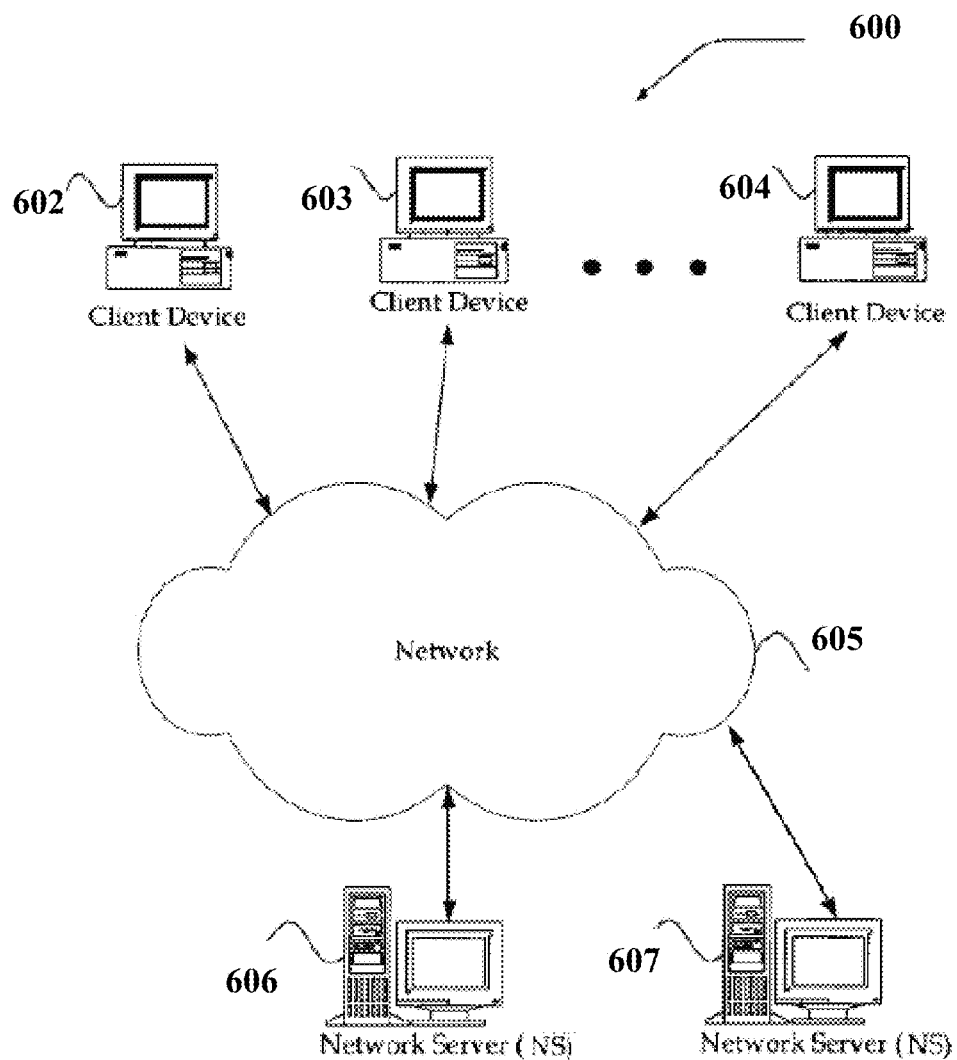

FIG. 6 illustrates one embodiment of an environment in which the present invention may operate. However, not all of these components may be required to practice the invention, and variations in the arrangement and type of the components may be made without departing from the spirit or scope of the invention. In some embodiment, the specifically programmed publishing platform of the instant invention can host a large number (e.g., at least 10, at least 50, at least 100, at least 500, at least 1,000, at least 10,000; at least 100,000; at least 1,000, 000) of members/participants (e.g., content creators, viewers, etc.) and/or process a large number (e.g., at least 1,000; at least 10,000; at least 100,000; at least 1,000,000) of concurrent transactions (e.g., interactions between the inventive publishing platform and viewers and/or creators, etc.). In other embodiments, the specifically programmed publishing systems of the instant invention are based on a scalable computer and network architecture that incorporates varies strategies for assessing the data, caching, searching, and database connection pooling. An example of the scalable architecture is an architecture that is capable of operating multiple servers.

In embodiments, members of the inventive computer system 602-604 (e.g. electronic devices of creators and/or viewers include virtually any computing device capable of receiving and sending a message over a network, such as network 105, to and from another computing device, such as servers 606 and 607, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in some embodiments, client devices 602-604 are any device that is capable of connecting using a wired or wireless communication medium such as a PDA, POCKET PC, wearable computer, and any other device that is equipped to communicate over a wired and/or wireless communication medium.

In some embodiments, each member device within member devices 602-604 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In some embodiments, member devices 602-604 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In some embodiments, network 605 may be configured to couple one computing device to another computing device to enable them to communicate. In some embodiments, network 605 may be enabled to employ any form of computer readable media for communicating information from one electronic device to another. Also, in some embodiments, network 605 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 605 includes any communication method by which information may travel between client devices 602-604, and servers 606 and 607.

Figure 7:
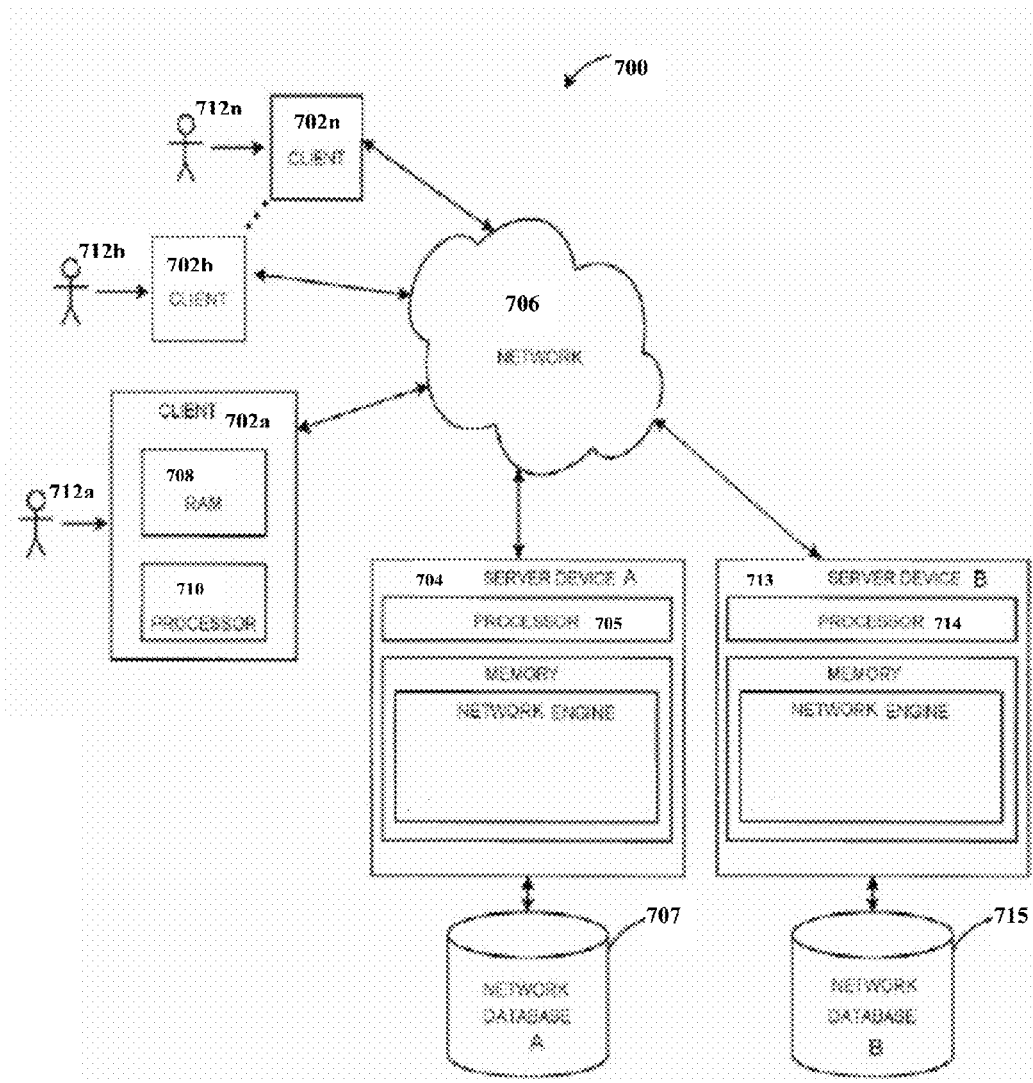

FIG. 7 shows another exemplary embodiment of the computer and network architecture that supports the specifically programmed publishing systems of the instant invention. The member devices 702a, 702b thru 702n shown (e.g., computers, portable devices, smartphones, etc.), each at least includes a computer-readable medium, such as a random access memory (RAM) 708 coupled to a processor 710 or FLASH memory. The processor 710 may execute computer-executable program instructions stored in memory 708. Such processors comprise a microprocessor, an ASIC, and state machines. Such processors comprise, or may be in communication with, media, for example computer-readable media, which stores instructions that, when executed by the processor, cause the processor to perform the steps described herein. In some embodiments of computer-readable media may include, but are not limited to, an electronic, optical, magnetic, or other storage or transmission device capable of providing a processor, such as the processor 710 of client 702a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 702a-n may also comprise a number of external or internal devices such as a mouse, a CD-ROM, DVD, a keyboard, a display, or other input or output devices. Examples of client devices 702a-n may be personal computers, digital assistants, personal digital assistants, cellular phones, mobile phones, smart phones, pagers, digital tablets, laptop computers, Internet appliances, and other processor-based devices. In general, a client device 702a are be any type of processor-based platform that is connected to a network 706 and that interacts with one or more application programs. Client devices 702a-n may operate on any operating system capable of supporting a browser or browser-enabled application, such as Microsoft™, Windows™, or Linux. The client devices 702a-n shown may include, for example, personal computers executing a browser application program such as Microsoft Corporation's Internet Explorer™, Apple Computer, Inc.'s Safari™, Mozilla Firefox, and Opera. Through the client devices 702a-n, users (e.g., creators, viewers, etc.) 712a-n communicate over the network 706 with each other and with other systems and devices coupled to the network 706. As shown in FIG. 7, server devices 704 and 713 may be also coupled to the network 706.

Figure 8:
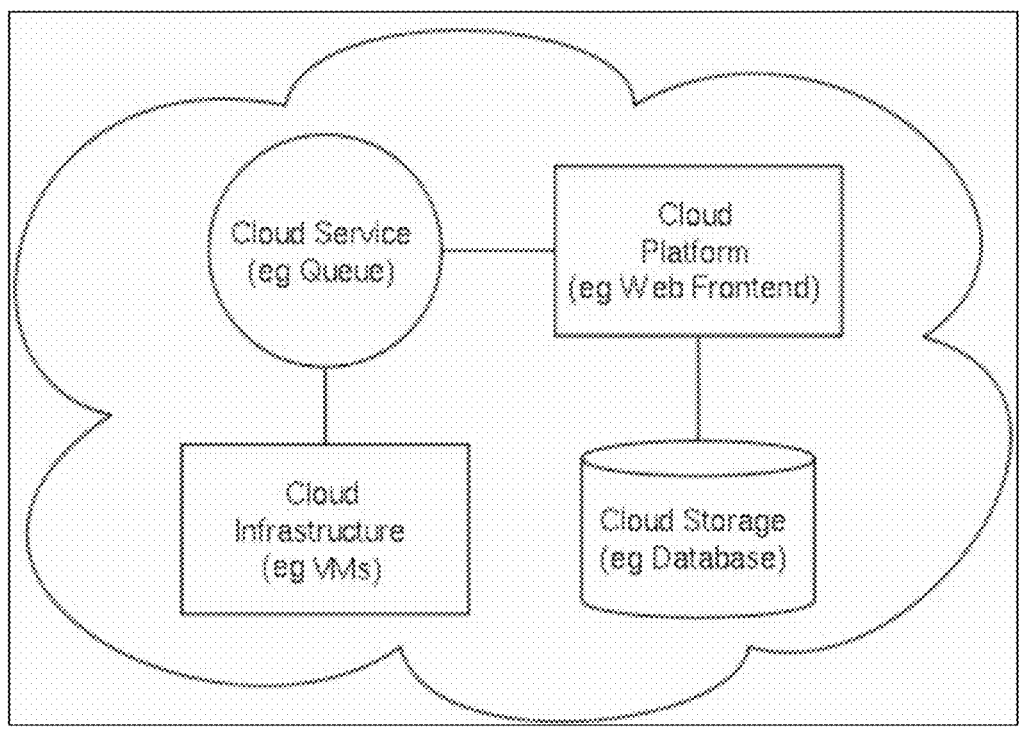
Figure 9:
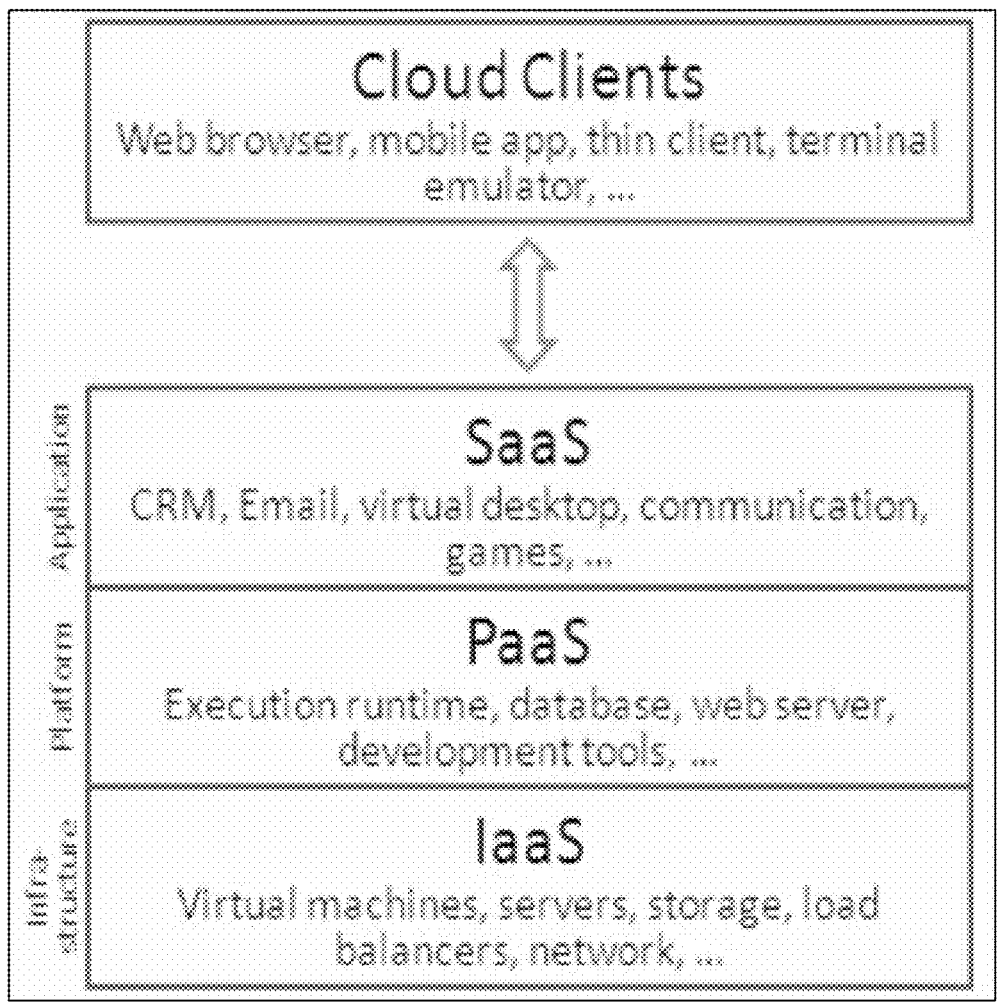

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 8 and 9 illustrate schematics of exemplary implementations of the cloud computing/architecture.

In some embodiments, the term "mobile electronic device" may refer to any portable electronic device that may or may not be enabled with location tracking functionality. For example, a mobile electronic device can include, but is not limited to, a mobile phone, tablet, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the instant invention utilizes location tracking technology or locating method to identify a location of, for example, a user's device. In some embodiments, the instant invention utilizes Radio Frequency Identification such as, but not limited to, any form of RFID tag for automatic tracking and/or automatic importing/accessing/retrieving of data.

In some embodiments, the instant invention can utilize near-field wireless communication (NFC) (e.g., for communicating with users' devices) that can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, NFC peer-to-peer communication can be conducted when a plurality of NFC-enable devices are within close proximity of each other.

In some embodiments, the instant invention provides for a computer system, including: at least one specifically programmed publishing server; at least one non-transitory database accessible by the at least one specifically programmed publishing server, where the at least one non-transitory database is specifically programmed to being dedicated for use by the at least one specifically programmed publishing server; at least one first network publishing portal specifically programmed for connecting a plurality of digital content creators and a plurality of digital content viewers to the at least one specifically programmed publishing server and coupling the at least one specifically programmed publishing server and the at least one non-transitory database, where the at least one specifically programmed publishing server, the at least one non-transitory database and the at least one first network publishing portal being arranged such that the computer system provides the at least one first network portal to the plurality of digital content creators and the plurality of digital content viewers through a plurality of electronic devices respectively utilized by the plurality of digital content creators and the plurality of digital content viewers to access the at least one first network publishing portal over a computer network; where the at least one specifically programmed publishing server, the at least one non-transitory database and the at least one first network publishing portal are specifically programmed with specialized publishing software; where the specialized publishing software, upon execution, specifically transforms the at least one specifically programmed publishing server, the at least one non-transitory database and the at least one first network publishing portal to perform at least the following: receiving, by the computer system, particular digital content from each digital content creator of the plurality of digital content creators; displaying, by the computer system, at least one specifically programmed hotspot template; i) where the at least one specifically programmed hotspot template permits each digital content creator of the plurality of digital content creators to define a plurality of hotspots in the particular digital content; ii) where each hotspot is an interactive visual programmed clue shown to a viewer when the viewer experiences at least one first portion of the particular digital content which allows the viewer, by selecting such hotspot to dynamically proceed to experience at least one second portion of the particular digital content; iii) where the at least one specifically programmed hotspot template is programmed to define, for each hotspot, at least the following hotspot criteria: 1) when to display such hotspot during the particular digital content, 2) where to display such hotspot in a visual area of a screen of a viewing electronic device; and 3) what to display when such hotspot is selected by the viewer; iv) where, by sequentially experiencing the at least one first portion of the particular digital content and the at least one second portion of the particular digital content, the viewer is allowed, by the computer system, to create at least one viewer personalized storyline digital experience which differs from at least one storyline digital experience pre-defined by such digital content creator of the particular digital content; enabling, by the computer system, utilizing the at least one specifically programmed hotspot template, a particular digital content creator to define at least one particular storyline digital experience based on the particular digital content, where the at least one particular storyline digital experience having a first plurality of particular hotspots; and enabling, by the computer system, a particular viewer to create at least one particular viewer personalized storyline digital experience of the particular digital content based on selecting at least one first particular hotspot from the first plurality of particular hotspots; where the at least one particular viewer personalized storyline digital experience created by the particular viewer differs from the at least one particular storyline digital experience defined by the particular digital content creator.

In some embodiments, the at least one particular storyline digital experience has a timeline and where the at least one first particular hotspot from the first plurality of particular hotspots is located on the timeline.

In some embodiments, the at least one particular storyline digital experience comprises a plurality of recordings selected from the group consisting of video recording, audio recording, slideshow, and any combination thereof.

In some embodiments, the at least one particular storyline digital experience comprises at least one image.

In some embodiments, the specialized publishing software, upon execution, specifically transforms the at least one specifically programmed publishing server, the at least one non-transitory database and the at least one first network publishing portal to perform at least the following: enabling, by the computer system, the particular digital content creator to organize the particular digital content in a hierarchical nesting classification based on a plurality of level categories selected from the group consisting of series, stories, chapters, and subchapters; where the series is the most top level category and the subchapters is the lowest level category.

In some embodiments, the first plurality of particular hotspots allow the particular personalized the at least one particular viewer personalized storyline digital experience by moving around in the particular digital content in at least one of the following direction within the hierarchical nesting classification: i) within the same level category, ii) from a particular level category to many level categories, and iii) within many level categories.

In some embodiments, the specialized publishing software, upon execution, specifically transforms the at least one specifically programmed publishing server, the at least one non-transitory database and the at least one first network publishing portal to perform at least the following: encoding, by the computer system, the particular digital content as a plurality of discreet modular units based on the at least one specifically programmed hotspot template so that each of plurality of discreet modular units is individually accessible by the particular viewer to create the at least one particular viewer personalized storyline digital experience of the particular digital content based on selecting at least one first particular hotspot from the first plurality of particular hotspots.

In some embodiments, the at least one specifically programmed hotspot template allows to the particular digital content creator to define at least one of the following characteristics for each particular hotspot: i) a shape, ii) a size, iii) a start time, and iv) a duration.

In some embodiments, the particular digital content is in a question-and-answer format.

In some embodiments, the enabling, by the computer system, the particular viewer to create at least one particular viewer personalized storyline digital experience of the particular digital content is through at least one widget embedded in the at least one first network publishing portal.

In some embodiments, the instant invention provides for a computer-implemented method, including: receiving, by a computer system, particular digital content from each digital content creator of a plurality of digital content creators; where the computer system includes at least the following: at least one specifically programmed publishing server; at least one non-transitory database accessible by the at least one specifically programmed publishing server, where the at least one non-transitory database is specifically programmed to being dedicated for use by the at least one specifically programmed publishing server; at least one first network publishing portal specifically programmed for connecting the plurality of digital content creators and a plurality of digital content viewers to the at least one specifically programmed publishing server and coupling the at least one specifically programmed publishing server and the at least one non-transitory database, where the at least one specifically programmed publishing server, the at least one non-transitory database and the at least one first network publishing portal being arranged such that the computer system provides the at least one first network portal to the plurality of digital content creators and the plurality of digital content viewers through a plurality of electronic devices respectively utilized by the plurality of digital content creators and the plurality of digital content viewers to access the at least one first network publishing portal over a computer network; where the at least one specifically programmed publishing server, the at least one non-transitory database and the at least one first network publishing portal are specifically programmed with specialized publishing software, enabling the computer system to perform the steps of the computer-implemented method; displaying, by the computer system, at least one specifically programmed hotspot template; i) where the at least one specifically programmed hotspot template permits each digital content creator of the plurality of digital content creators to define a plurality of hotspots in the particular digital content; ii) where each hotspot is an interactive visual programmed clue shown to a viewer when the viewer experiences at least one first portion of the particular digital content which allows the viewer, by selecting such hotspot to dynamically proceed to experience at least one second portion of the particular digital content; iii) where the at least one specifically programmed hotspot template is programmed to define, for each hotspot, at least the following hotspot criteria: 1) when to display such hotspot during the particular digital content, 2) where to display such hotspot in a visual area of a screen of a viewing electronic device; and 3) what to display when such hotspot is selected by the viewer; iv) where, by sequentially experiencing the at least one first portion of the particular digital content and the at least one second portion of the particular digital content, the viewer is allowed, by the computer system, to create at least one viewer personalized storyline digital experience which differs from at least one storyline digital experience pre-defined by such digital content creator of the particular digital content; enabling, by the computer system, utilizing the at least one specifically programmed hotspot template, a particular digital content creator to define at least one particular storyline digital experience based on the particular digital content, where the at least one particular storyline digital experience having a first plurality of particular hotspots; and enabling, by the computer system, a particular viewer to create at least one particular viewer personalized storyline digital experience of the particular digital content based on selecting at least one first particular hotspot from the first plurality of particular hotspots; where the at least one particular viewer personalized storyline digital experience created by the particular viewer differs from the at least one particular storyline digital experience defined by the particular digital content creator.

While a number of embodiments of the present invention have been described, it is understood that these embodiments are illustrative only, and not restrictive, and that many modifications may become apparent to those of ordinary skill in the art.

What is claimed is:

1. A computer system, comprising:
   at least one specifically programmed publishing server;
   at least one non-transitory database accessible by the at least one specifically programmed publishing server, wherein the at least one non-transitory database is specifically programmed to being dedicated for use by the at least one specifically programmed publishing server; and
   at least one first network publishing portal specifically programmed for connecting a plurality of digital content creators to the at least one specifically programmed publishing server and coupling the at least one specifically programmed publishing server and the at least one non-transitory database, wherein the at least one specifically programmed publishing server, the at least one non-transitory database and the at least one first network publishing portal being arranged such that the computer system provides the at least one first network portal to the plurality of digital content creators through a plurality of electronic devices respectively utilized by the plurality of digital content creators to access the at least one first network publishing portal over a computer network, wherein the at least one specifically programmed publishing server, the at least one non-transitory database and the at least one first network publishing portal are specifically controlled by specialized publishing software; and wherein the specialized publishing software, upon execution, specifically causes the at least one specifically programmed publishing server, the at least one non-transitory database and the at least one first network publishing portal to perform at least the following:

receiving, by the computer system, a plurality of media assets from a particular digital content creator of the plurality of digital content creators, wherein the plurality of media assets are utilized by the particular digital content creator to define a plurality of states of a specifically programmed player unit and a transition sequence in which the specifically programmed player unit transitions between the plurality of states, wherein the transition sequence represents at least one creator-defined storyline digital experience of the particular digital content creator;

causing to display, by the computer system, a plurality of specifically programmed templates to the particular digital content creator for defining the at least one creator-defined storyline digital experience, wherein each specifically programmed template:

corresponds to a particular state among the plurality of states of the specifically programmed player unit;

allows the particular digital content creator to associate at least one media asset of the plurality of media assets with the particular state;

defines a plurality of rules by which a viewer is allowed to interact with the at least one media asset, wherein the plurality of rules comprise a subset of rules that define at least one specifically programmed hotspot associated with the particular state of the specifically programmed player unit and the at least one media asset;

wherein the at least one specifically programmed hotspot is:

an interactive visually overlaid clue which is being displayed, based on metadata, by the specifically programmed player unit, over the at least one media asset during the particular state of the specifically programmed player unit, and a transition point, when the at least one specifically programmed hotspot is activated by a particular viewer, from a first state of the specifically programmed player unit corresponding to displaying at least a portion of at least one first media asset within a primary frame position of an application window to a second state of the specifically programmed player unit corresponding to displaying at least one a portion of at least one second media asset within the primary frame position of the same application window of the specifically programmed player unit so that the particular viewer is allowed to transition between the first state and the second state in accordance with a personalized transition sequence, representing at least one viewer personalized storyline digital experience of the particular viewer, wherein the same at least one creator-defined storyline digital experience comprises the first state and the second state;

wherein the subset of rules for the at least one specifically programmed hotspot comprises at least all of the following hotspot criteria:

a start time defining when to display the at least one specifically programmed hotspot during a displaying time of the at least one media asset, a displaying duration defining an amount of time to display the at least one specifically programmed hotspot by the specifically programmed player unit, a position defining where to display the at least one specifically programmed hotspot with respect to the at least one media asset, and a shape of such specifically programmed hotspot;

generating, by the computer system, a programmed link for each specifically programmed template, wherein the programmed link is displayed within the application window of the specifically programmed player unit when the specifically programmed player unit executes the particular state to which such specifically programmed template corresponds;

storing, by the computer system, in the at least one non-transitory database, each specifically programmed template as a discreet modular unit, comprising:

the at least one media asset associated with such specifically programmed template, and metadata corresponding to the plurality of rules;

causing, by the computer system, based on the metadata, the specifically programmed player unit to transition, when the at least one specifically programmed hotspot is activated by the particular viewer, between the first state of the specifically programmed player unit corresponding to displaying the portion of the at least one first media asset within the primary frame position of the application window to the second state of the specifically programmed player unit corresponding to displaying the portion of the at least one second media asset within the primary frame position of the same application window of the specifically programmed player unit in accordance with the personalized transition sequence, representing the at least one viewer personalized storyline digital experience of the particular viewer, wherein the at least one viewer personalized storyline digital experience of the particular viewer differs from the at least one creator-defined storyline digital experience based on the transition sequence defined by the particular digital content creator and the personalized transition sequence utilized by the particular viewer.

2. The computer system of claim 1, wherein the specialized publishing software, upon execution, causes to perform at least the following:

causing, by the computer system, the specifically programmed player unit to further display within the application window a timeline associated with the at least one media asset, and wherein the at least one specifically programmed hotspot is visually overlaid on the timeline based, at least in part, on values of the start time and the displaying duration identified by the subset of rules in the metadata.

3. The computer system of claim 1, wherein the plurality of media assets are selected from the group consisting of at least one particular video recording, at least one particular audio recording, at least one particular slideshow, at least one particular image, at least one particular text, a subset of a plurality of video recordings, a subset of a plurality of audio recordings, a subset of a plurality of images, a subset of a plurality of text items, and any combination thereof.

4. The computer system of claim 1, wherein the plurality of states are defined by the particular digital content creator in a hierarchical nesting classification, wherein the hierarchical nesting classification is based on a plurality of level categories selected from the group consisting of a series, a story, a chapter, and a subchapter; wherein the series is the most top level category and the subchapter is the lowest level category.

5. The computer system of claim 4, wherein, based on the metadata, the specifically programmed player unit allows the particular viewer to define the personalized transition sequence, representing the at least one viewer personalized storyline digital experience, in accordance with at least one of the following direction within the hierarchical nesting classification:
  i) within the same level category,
  ii) from a particular level category to many level categories, and
  iii) within many level categories.

6. The computer system of claim 1, wherein the at least one creator-defined storyline digital experience is defined by the particular digital content creator to be in a question-and-answer format.

7. The computer system of claim 1, wherein the specifically programmed player unit is one of: a specifically programmed widget embedded in the at least one first network publishing portal, and a specifically programmed Internet browser.

8. A computer-implemented method, comprising:
  receiving, by at least one specifically programmed publishing server, a plurality of media assets from a particular digital content creator of a plurality of digital content creators, wherein the plurality of media assets are utilized by the particular digital content creator to define a plurality of states of a specifically programmed player unit and a transition sequence in which the specifically programmed player unit transitions between the plurality of states, wherein the transition sequence represents at least one creator-defined storyline digital experience of the particular digital content creator;
  causing to display, by the at least one specifically programmed publishing server, a plurality of specifically programmed templates to the particular digital content creator for defining the at least one creator-defined storyline digital experience,
  wherein each specifically programmed template:
    corresponds to a particular state among the plurality of states of the specifically programmed player unit;
    allows the particular digital content creator to associate at least one media asset of the plurality of media assets with the particular state;
    define a plurality of rules by which a viewer is allowed to interact with the at least one media asset,
    wherein the plurality of rules comprise a subset of rules that define at least one specifically programmed hotspot associated with the particular state of the specifically programmed player unit and the at least one media asset;
    wherein the at least one specifically programmed hotspot is:
      an interactive visually overlaid clue which is being displayed, based on metadata, by the specifically programmed player unit, over the at least one media asset during the particular state of the specifically programmed player unit, and
      a transition point, when the at least one specifically programmed hotspot is activated by a particular viewer, from a first state of the specifically programmed player unit corresponding to displaying at least a portion of at least one first media asset within a primary frame position of an application window to a second state of the specifically programmed player unit corresponding to displaying at least one a portion of at least one second media asset within the primary frame position of the same application window of the specifically programmed player unit so that the particular viewer is allowed to transition between the first state and the second state in accordance with a personalized transition sequence, representing at least one viewer personalized storyline digital experience of the particular viewer, wherein the same at least one creator-defined storyline digital experience comprises the first state and the second state;
    wherein the subset of rules for the at least one specifically programmed hotspot comprises at least all of the following hotspot criteria:
      a start time defining when to display the at least one specifically programmed hotspot during a displaying time of the at least one media asset,
      a displaying duration defining an amount of time to display the at least one specifically programmed hotspot by the specifically programmed player unit,
      a position defining where to display the at least one specifically programmed hotspot with respect to the at least one media asset, and
      a shape of such specifically programmed hotspot;
  generating, by the at least one specifically programmed publishing server, a programmed link for each specifically programmed template, wherein the programmed link is displayed within the application window of the specifically programmed player unit when the specifically programmed player unit executes the particular state to which such specifically programmed template corresponds;
  storing, by the at least one specifically programmed publishing server, in at least one non-transitory database, each specifically programmed template as a discreet modular unit, comprising:
    the at least one media asset associated with such specifically programmed template, and
    metadata corresponding to the plurality of rules;
  causing, by the at least one specifically programmed publishing server, based on the metadata, the specifically programmed player unit to transition, when the at least one specifically programmed hotspot is activated by the particular viewer, between the first state of the specifically programmed player unit corresponding to displaying the portion of the at least one first media asset within the primary frame position of the application window to the second state of the specifically programmed player unit corresponding to displaying the portion of the at least one second media asset within the primary frame position of the same application window of the specifically programmed player unit in accordance with the personalized transition sequence, representing the at least one viewer personalized storyline digital experience of the particular viewer, wherein the at least one viewer personalized storyline digital experience of the particular viewer differs from the at least one creator-defined storyline digital experience based on the transition sequence defined by the particular digital content creator and the personalized transition sequence utilized by the particular viewer.

9. The computer-implemented method of claim 8, further comprising:

causing, by the at least one specifically programmed publishing server, the specifically programmed player unit to further display within the application window a timeline associated with the at least one media asset, and wherein the at least one specifically programmed hotspot is visually overlaid on the timeline based, at least in part, on values of the start time and the displaying duration identified by the subset of rules in the metadata.

10. The computer-implemented method of claim 8, wherein the plurality of media assets are selected from the group consisting of at least one particular video recording, at least one particular audio recording, at least one particular slideshow, at least one particular image, at least one particular text, a subset of a plurality of video recordings, a subset of a plurality of audio recordings, a subset of a plurality of images, a subset of a plurality of text items, and any combination thereof.

11. The computer-implemented method of claim 8, wherein the plurality of states are defined by the particular digital content creator in a hierarchical nesting classification, wherein the hierarchical nesting classification is based on a plurality of level categories selected from the group consisting of a series, a story, a chapter, and a subchapter; wherein the series is the most top level category and the subchapter is the lowest level category.

12. The computer-implemented method of claim 11, wherein, based on the metadata, the specifically programmed player unit allows the particular viewer to define the personalized transition sequence, representing the at least one viewer personalized storyline digital experience, in accordance with at least one of the following direction within the hierarchical nesting classification:

i) within the same level category, ii) from a particular level category to many level categories, and iii) within many level categories.

13. The computer-implemented method of claim 8, wherein the at least one creator-defined storyline digital experience is defined by the particular digital content creator to be in a question-and-answer format.

14. The computer-implemented method of claim 8, wherein the specifically programmed player unit is one of: a specifically programmed widget embedded in an at least one network publishing portal, and a specifically programmed Internet browser.

\* \* \* \* \*